(12) United States Patent
Nakajima et al.

(10) Patent No.: US 12,474,359 B2
(45) Date of Patent: Nov. 18, 2025

(54) AUTOMATIC ANALYSIS SYSTEM AND SPECIMEN CONVEYING METHOD

(71) Applicant: Hitachi High-Tech Corporation, Tokyo (JP)

(72) Inventors: Satoshi Nakajima, Tokyo (JP); Akihiro Yasui, Tokyo (JP); Takeshi Setomaru, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 929 days.

(21) Appl. No.: 17/294,190

(22) PCT Filed: Dec. 2, 2019

(86) PCT No.: PCT/JP2019/047051
§ 371 (c)(1),
(2) Date: May 14, 2021

(87) PCT Pub. No.: WO2020/152991
PCT Pub. Date: Jul. 30, 2020

(65) Prior Publication Data
US 2022/0011333 A1 Jan. 13, 2022

(30) Foreign Application Priority Data
Jan. 25, 2019 (JP) .................................. 2019-011439

(51) Int. Cl.
*G01N 35/04* (2006.01)
*B01L 3/00* (2006.01)
(Continued)

(52) U.S. Cl.
CPC ............ *G01N 35/04* (2013.01); *B01L 3/5023* (2013.01); *B01L 7/5255* (2013.01);
(Continued)

(58) Field of Classification Search
CPC ............... G01N 35/04; G01N 35/1002; G01N 2035/0441; G01N 35/0092; G01N 35/026;
(Continued)

(56) References Cited

U.S. PATENT DOCUMENTS

2020/0271678 A1\* 8/2020 Akutsu ............ G01N 35/00584

FOREIGN PATENT DOCUMENTS

JP 63-286769 A 11/1988
JP 2008-281453 A 11/2008
(Continued)

OTHER PUBLICATIONS

Extended European Search Report issued in European Application No. 19910927.3 dated Sep. 16, 2022 (11 pages).
(Continued)

*Primary Examiner* — P. Kathryn Wright
(74) *Attorney, Agent, or Firm* — Crowell & Moring LLP

(57) ABSTRACT

Provided is an automatic analysis system in which a conveying line 104 and a plurality of dispensation lines 209, 309 are disposed not to be parallel, and a device layout of analysis modules 200, 300 disposed with a specimen rack distribution module 100 therebetween is line-symmetric with respect to a straight line 100A passing through the rotation center of a standby disc 106. Accordingly, even when the automatic analysis system has a configuration for providing specimens from a common specimen rack distribution module to a plurality of analysis modules, the conveyance efficiency of a specimen rack is raised and user accessibility is good.

10 Claims, 16 Drawing Sheets

(51) Int. Cl.
  *B01L 7/00* (2006.01)
  *G01N 24/10* (2006.01)
  *G01N 35/10* (2006.01)
  *B04B 11/04* (2006.01)

(52) U.S. Cl.
  CPC .... *G01N 35/1002* (2013.01); *B04B 2011/046* (2013.01); *G01N 2035/0441* (2013.01)

(58) Field of Classification Search
  CPC .... G01N 2035/0413; G01N 2035/0465; B01L 3/5023; B01L 7/5255; B04B 2011/046
  See application file for complete search history.

(56) References Cited

FOREIGN PATENT DOCUMENTS

| | | |
|---|---|---|
| JP | 2009-216459 A | 9/2009 |
| JP | 2010-204129 A | 9/2010 |
| WO | WO 2018/221220 A1 | 12/2018 |

OTHER PUBLICATIONS

International Search Report (PCT/ISA/210) issued in PCT Application No. PCT/JP2019/047051 dated Feb. 10, 2020 with English translation (seven (7) pages).

Japanese-language Written Opinion (PCT/ISA/237) issued in PCT Application No. PCT/JP2019/047051 dated Feb. 10, 2020 (four (4) pages).

\* cited by examiner

[FIG. 1]
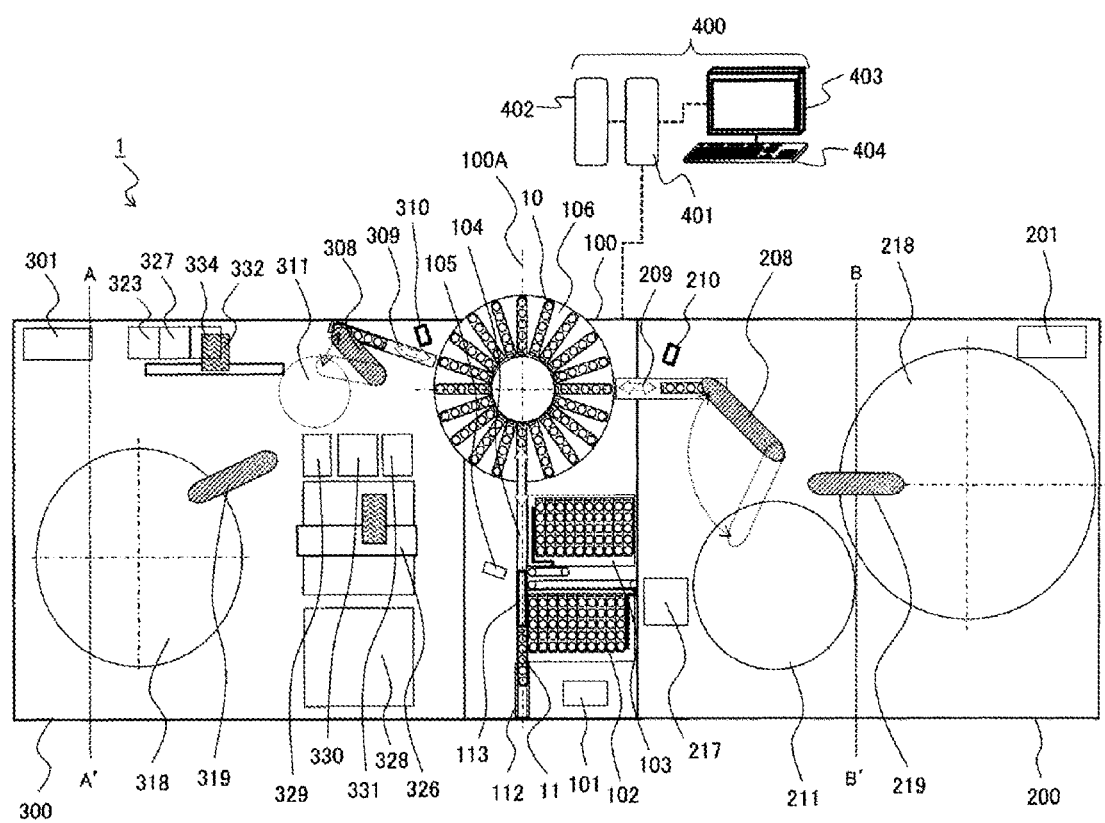

[FIG. 2]
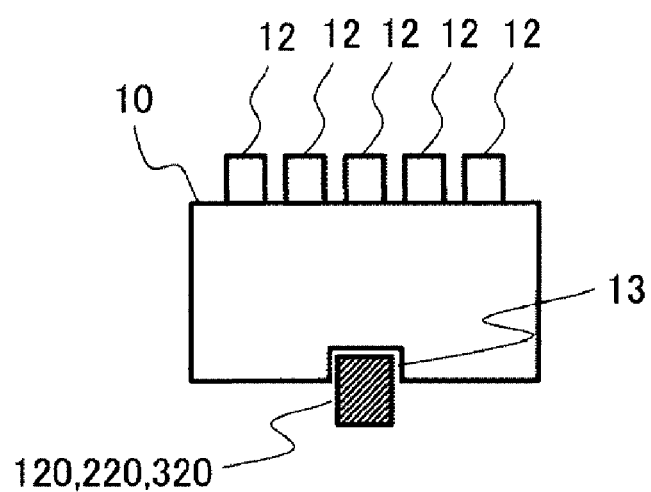

[FIG. 3]
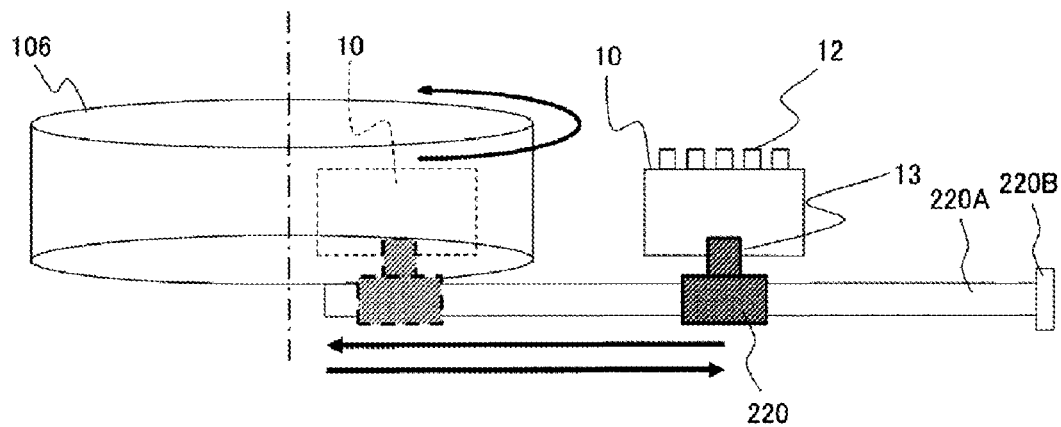

[FIG. 4]
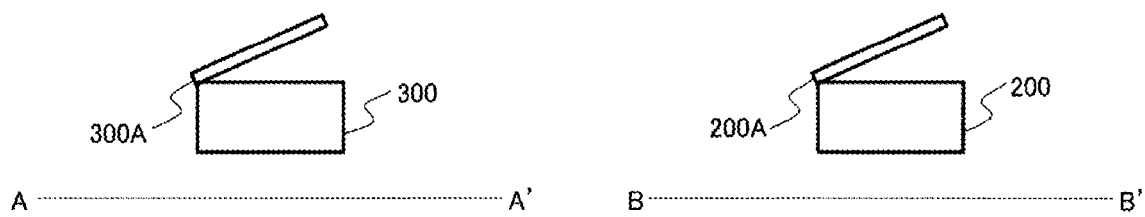

[FIG. 5]
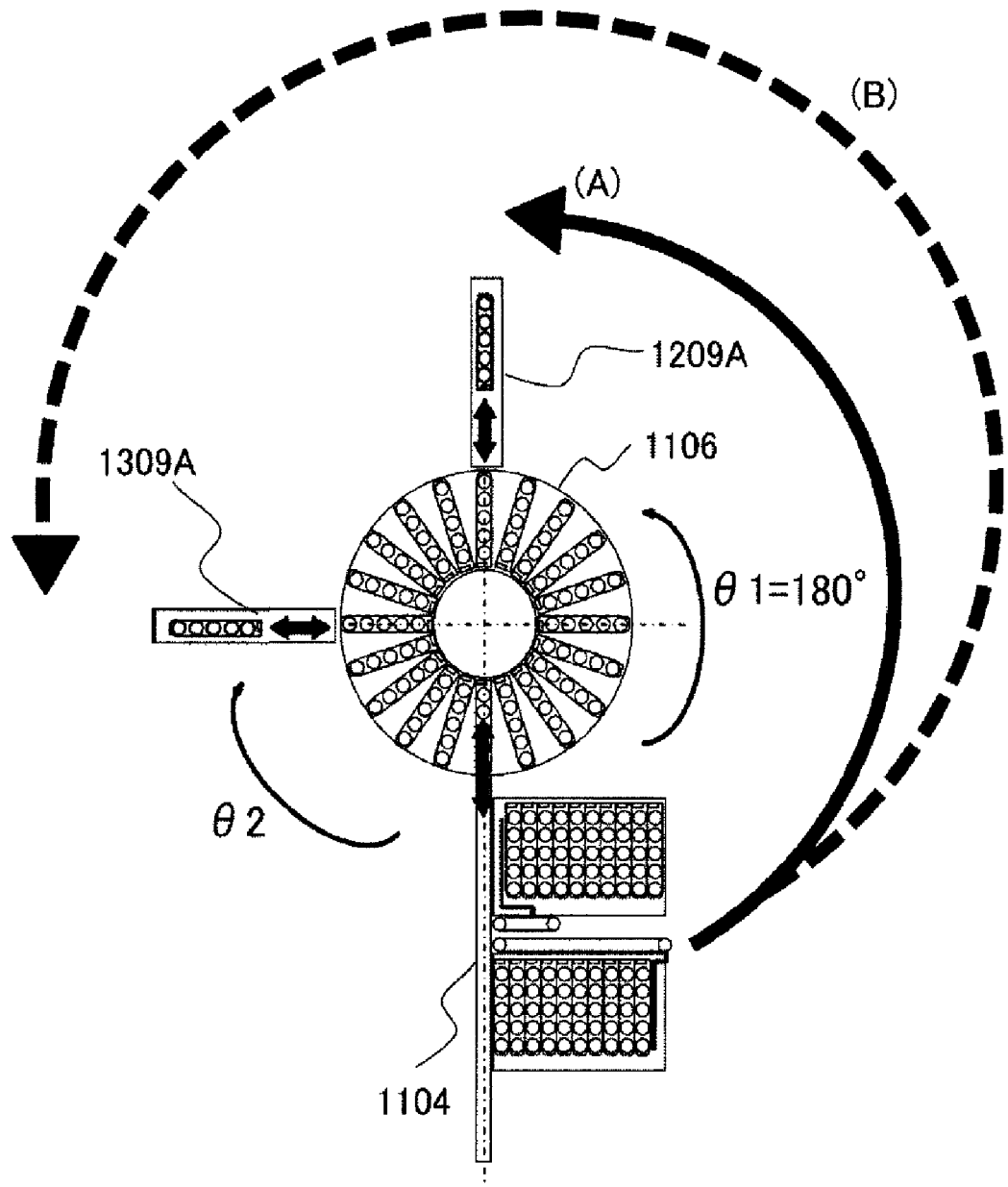

[FIG. 6]
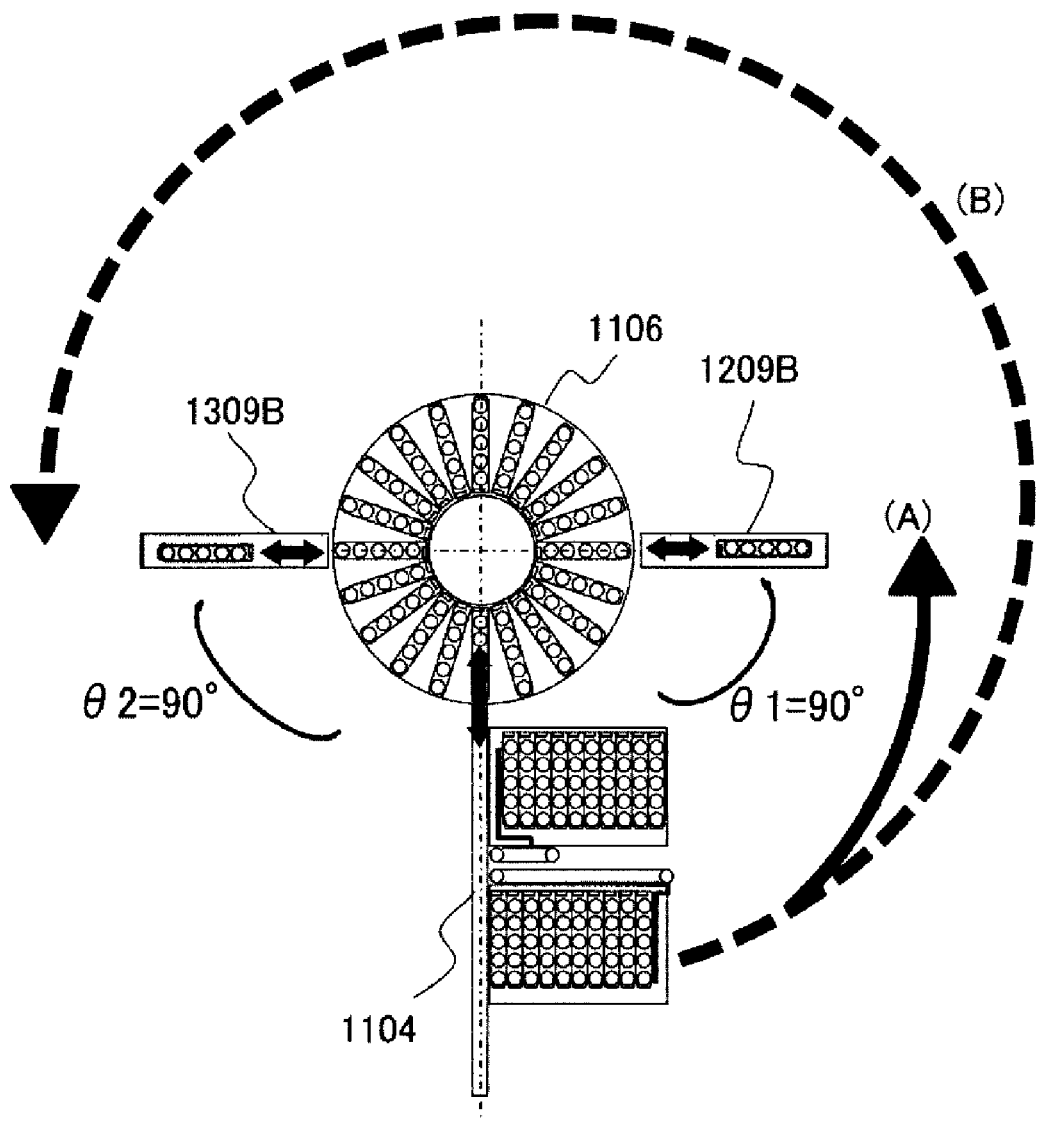

[FIG. 7]
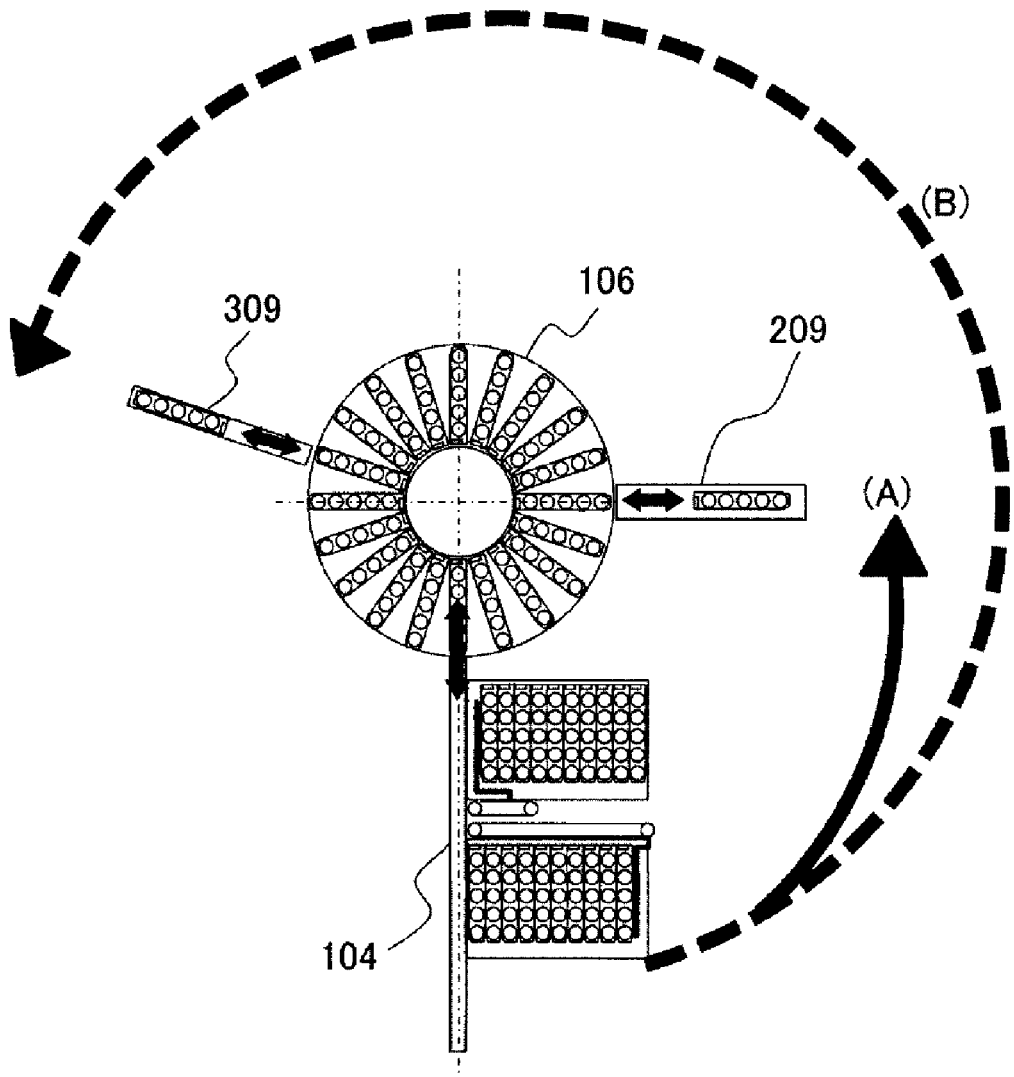

[FIG. 8]
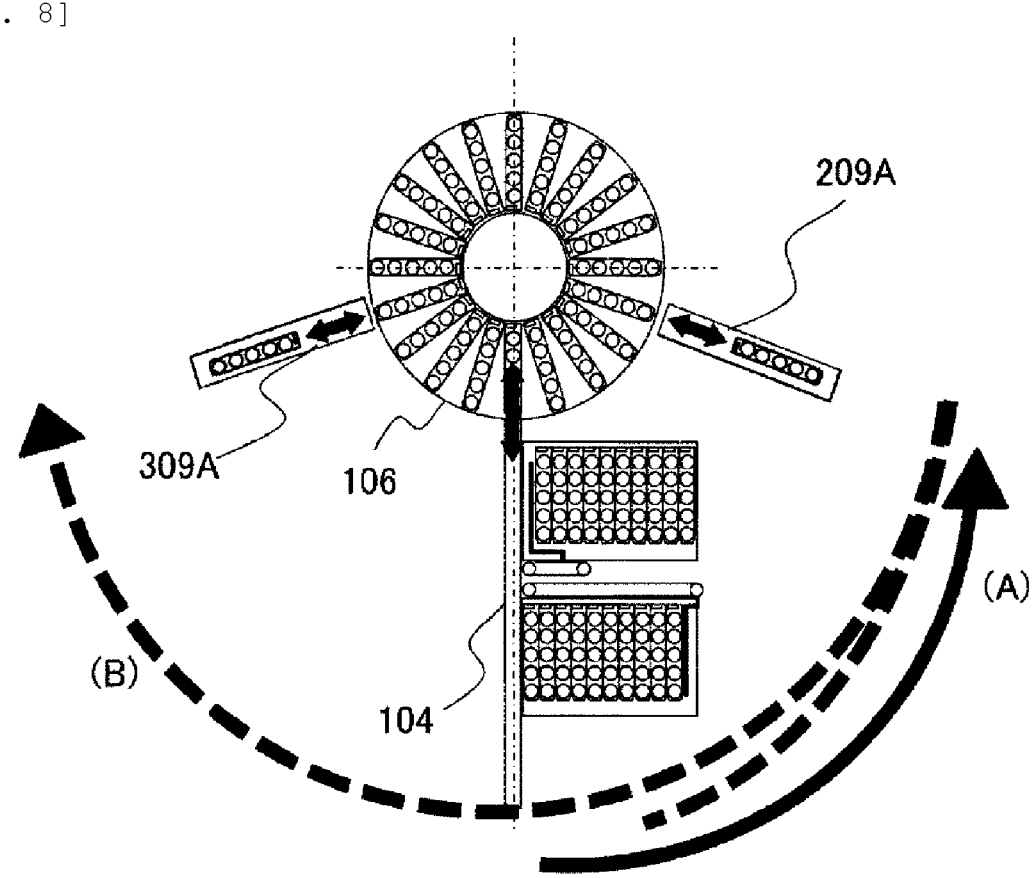

[FIG. 9]

| | | θ1 | | | | | | | | | |
|---|---|---|---|---|---|---|---|---|---|---|---|
| | | 18 | 36 | 54 | 72 | 90 | 108 | 126 | 144 | 162 | 180 |
| θ2 | 18 | 54 | 90 | 126 | 162 | 198 | 234 | 270 | 306 | 342 | 342 |
| | 36 | 72 | 108 | 144 | 180 | 216 | 252 | 288 | 324 | 324 | 324 |
| | 54 | 90 | 126 | 162 | 198 | 234 | 270 | 306 | 306 | 306 | 306 |
| | 72 | 108 | 144 | 180 | 216 | 252 | 288 | 288 | 288 | 288 | 288 |
| | 90 | 126 | 162 | 198 | 234 | 270 | 270 | 270 | 270 | 270 | 270 |
| | 108 | 144 | 180 | 216 | 252 | 252 | 252 | 252 | 252 | 252 | 252 |
| | 126 | 162 | 198 | 234 | 234 | 234 | 234 | 234 | 234 | 234 | 234 |
| | 144 | 180 | 216 | 216 | 216 | 216 | 216 | 216 | 216 | 216 | 216 |
| | 162 | 198 | 198 | 198 | 198 | 198 | 198 | 198 | 198 | 198 | 198 |
| | 180 | 180 | 180 | 180 | 180 | 180 | 180 | 180 | 180 | 180 | 180 |

ARRANGEMENT OF FIG. 8

ARRANGEMENT OF FIG. 6

ARRANGEMENT OF FIG. 7

ARRANGEMENT OF FIG. 5

[FIG. 10]
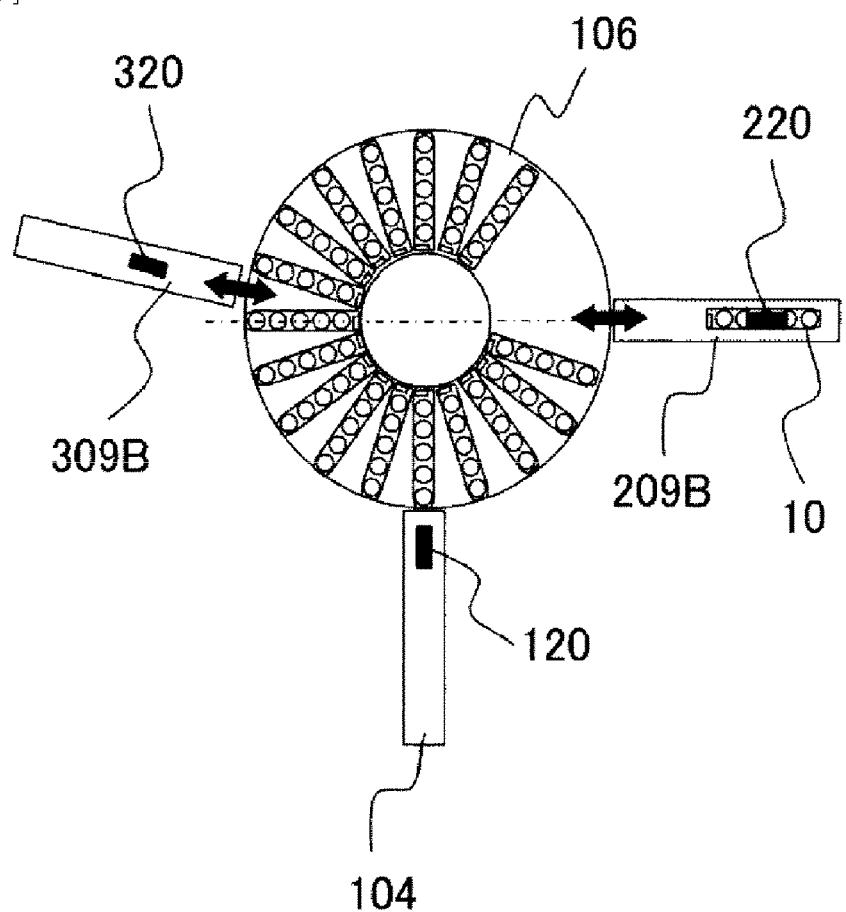
[FIG. 11]
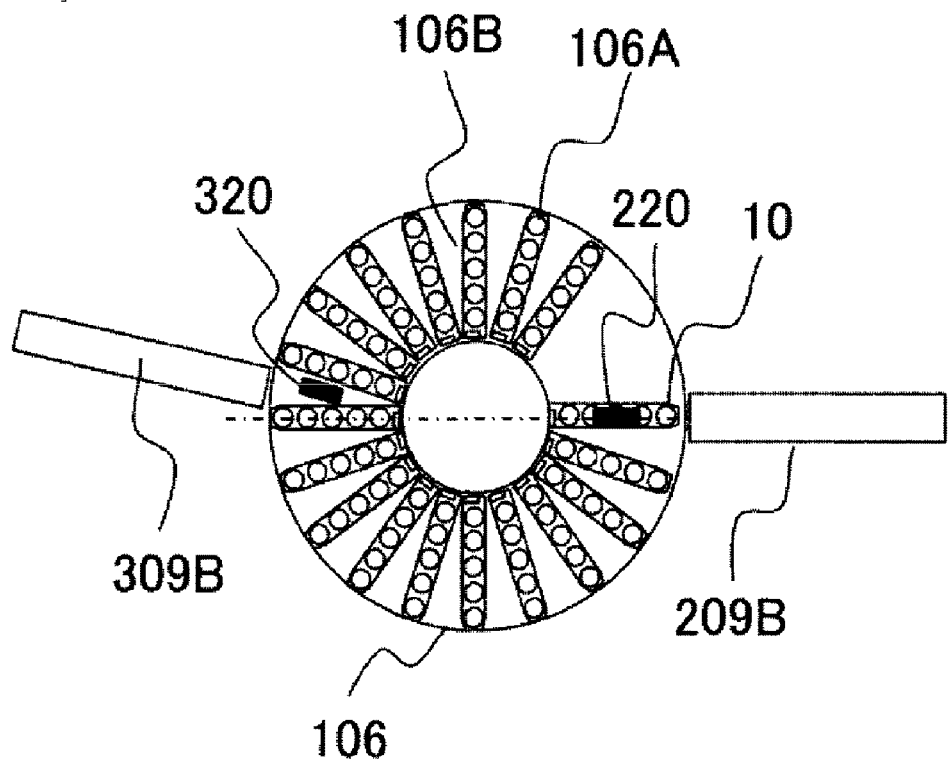

[FIG. 12]
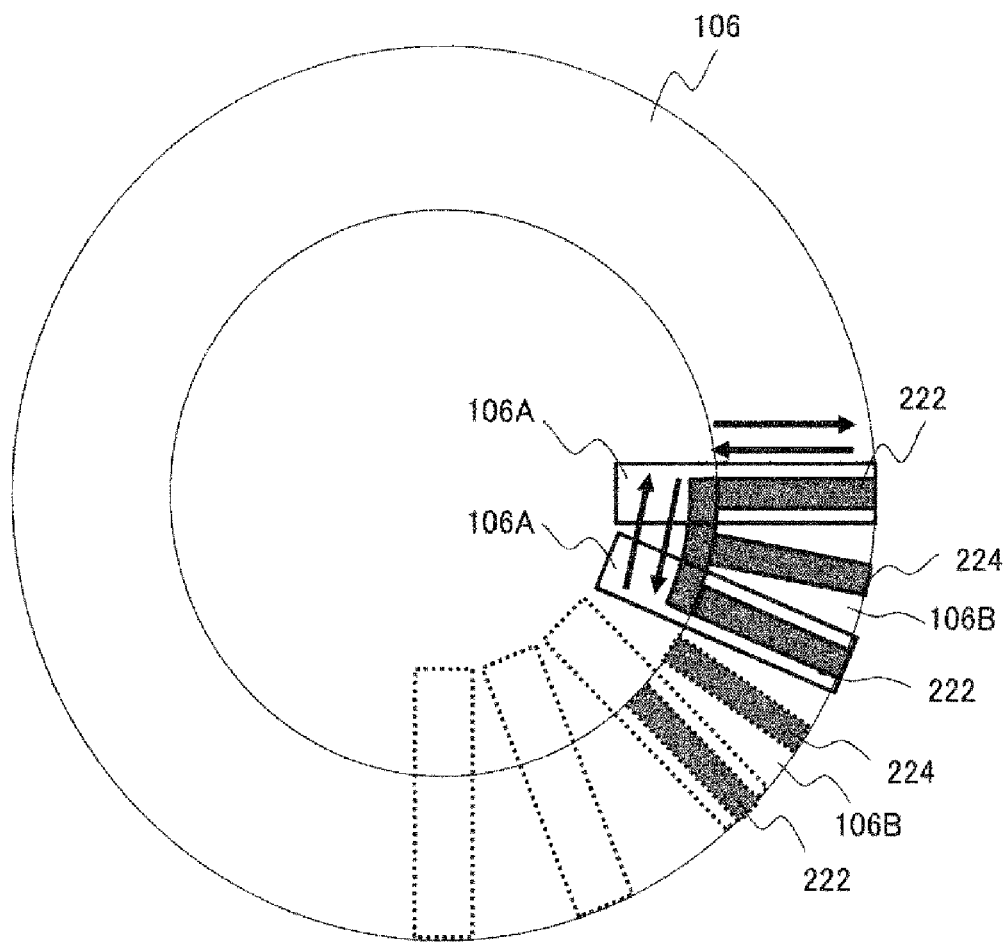
[FIG. 13]
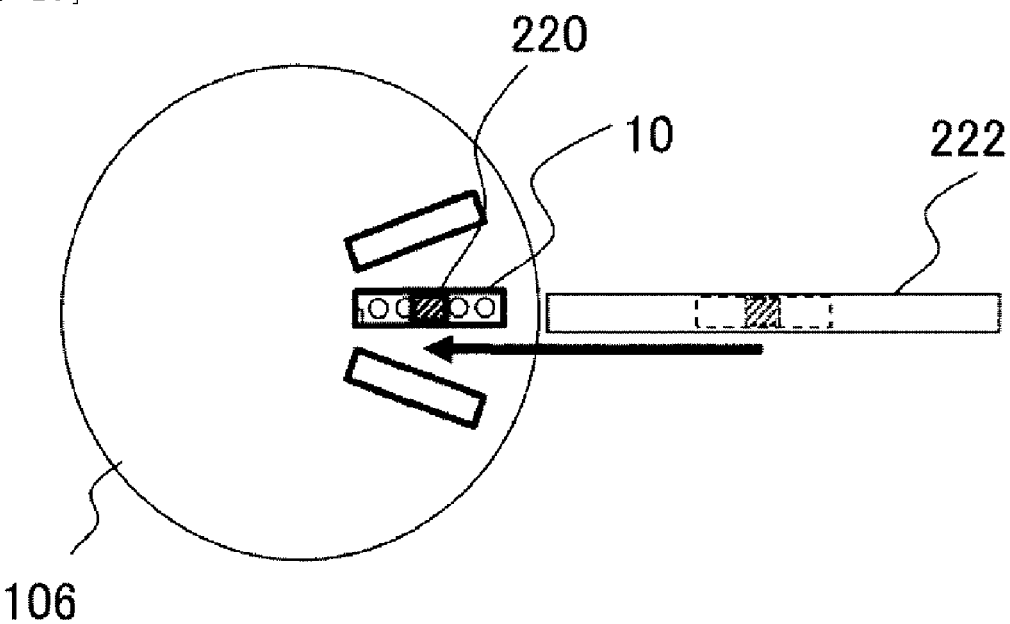

[FIG. 14]
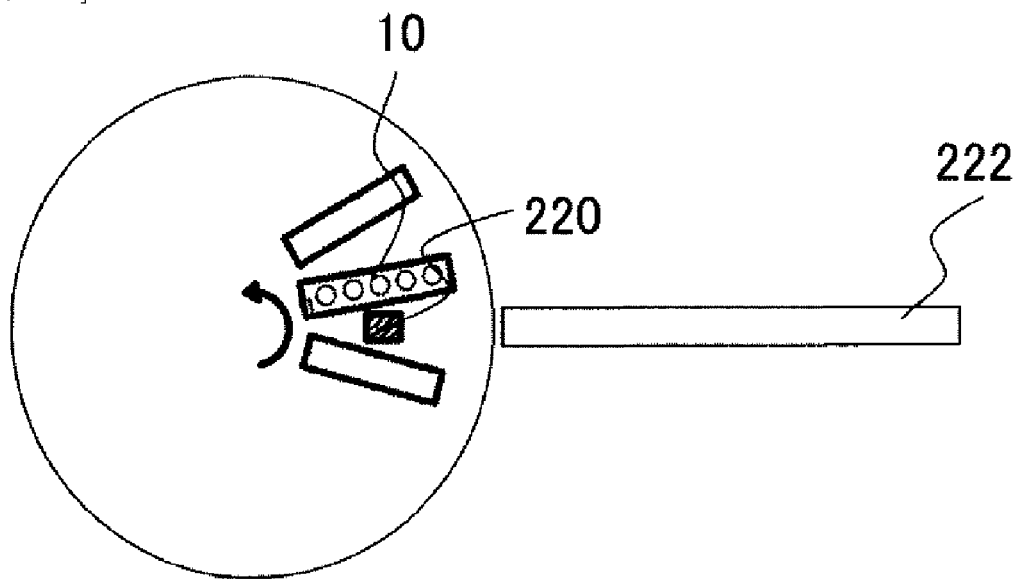
[FIG. 15]
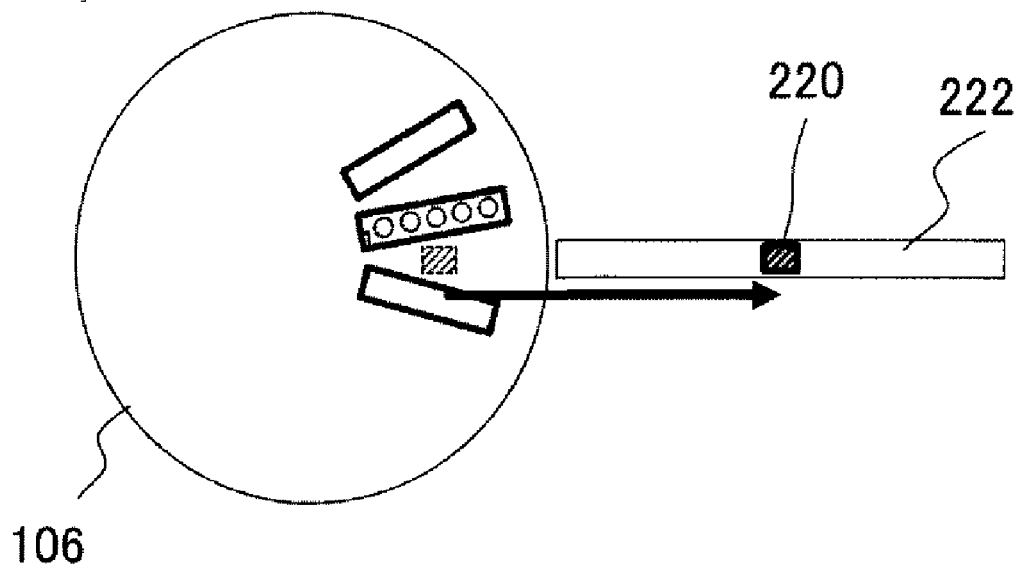

[FIG. 16]
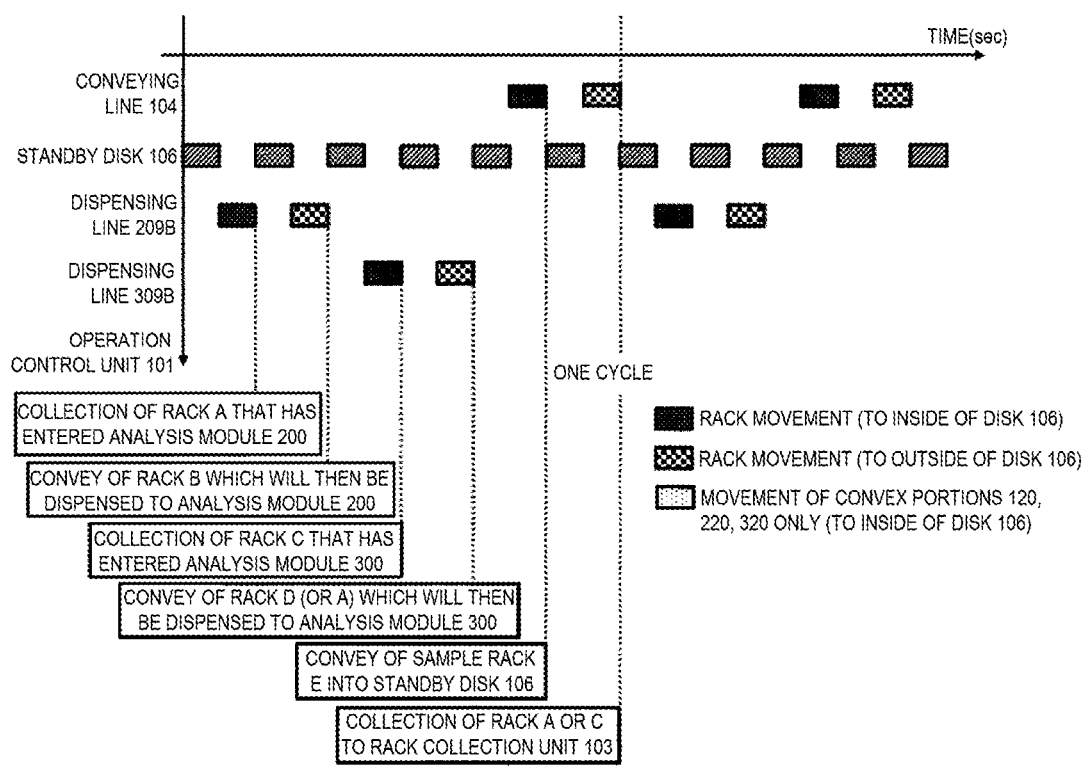

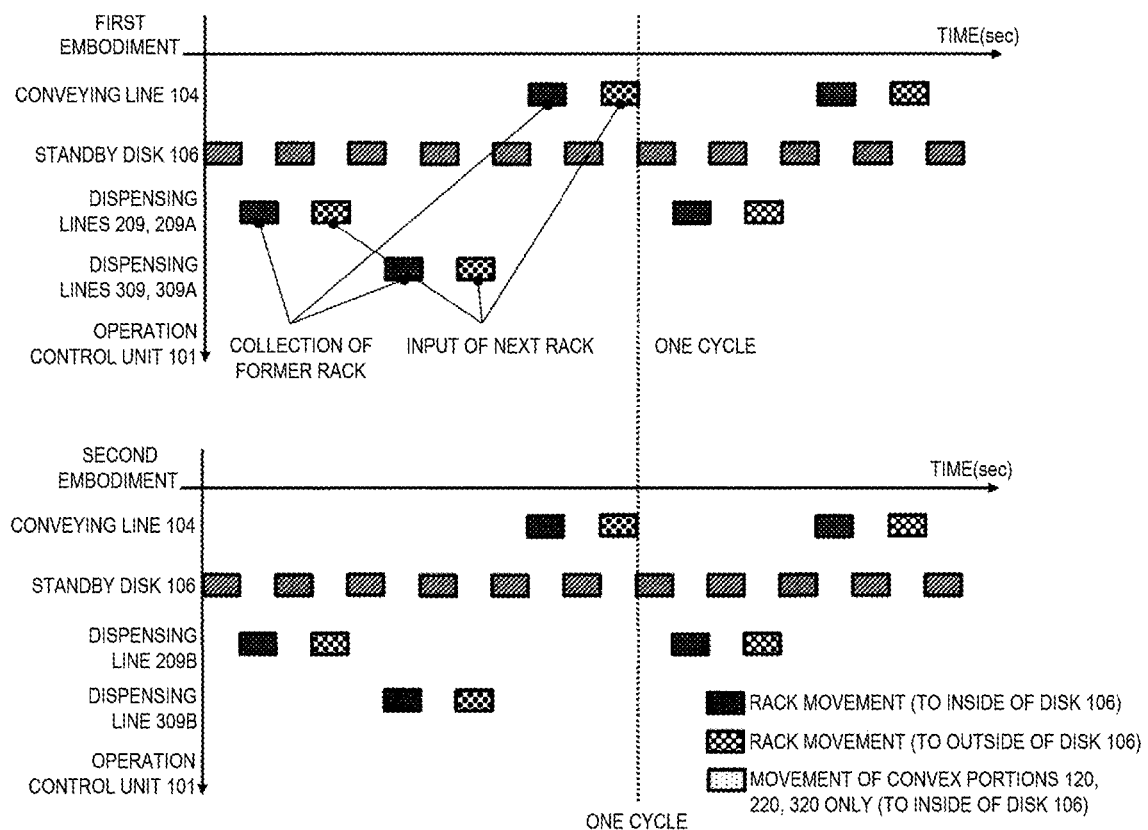

[FIG. 18]
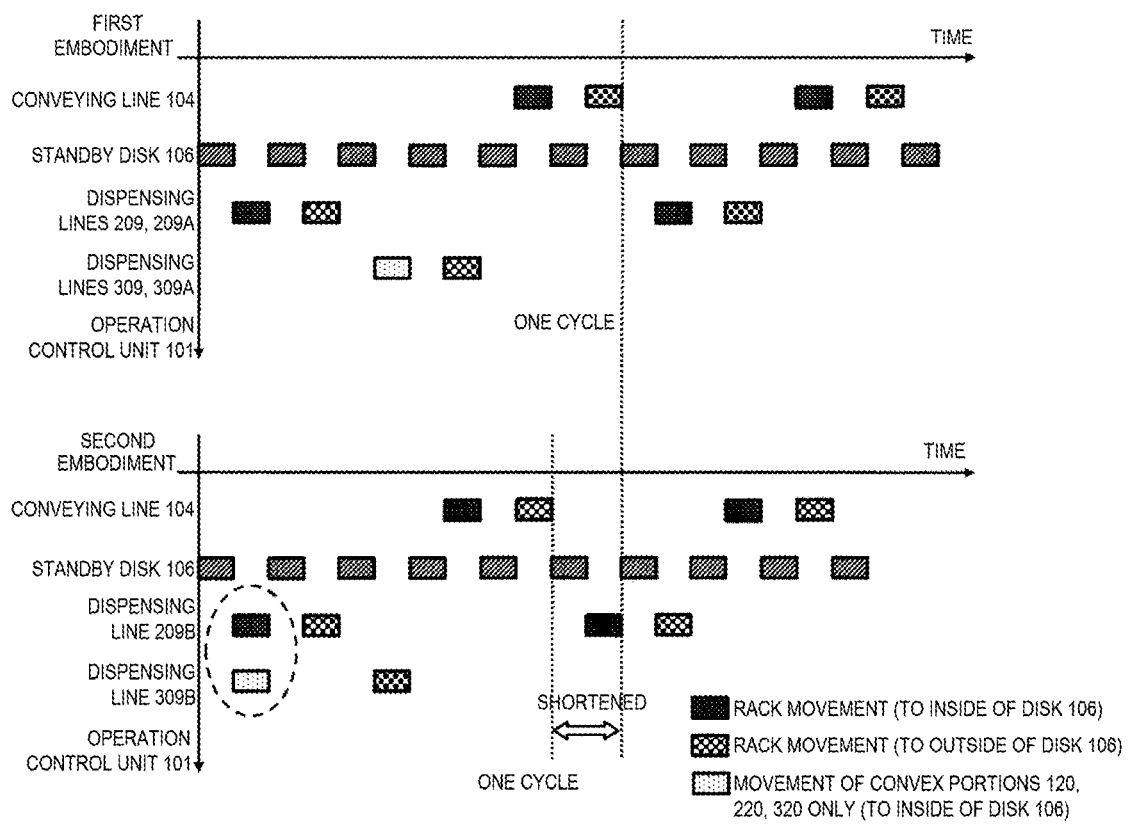

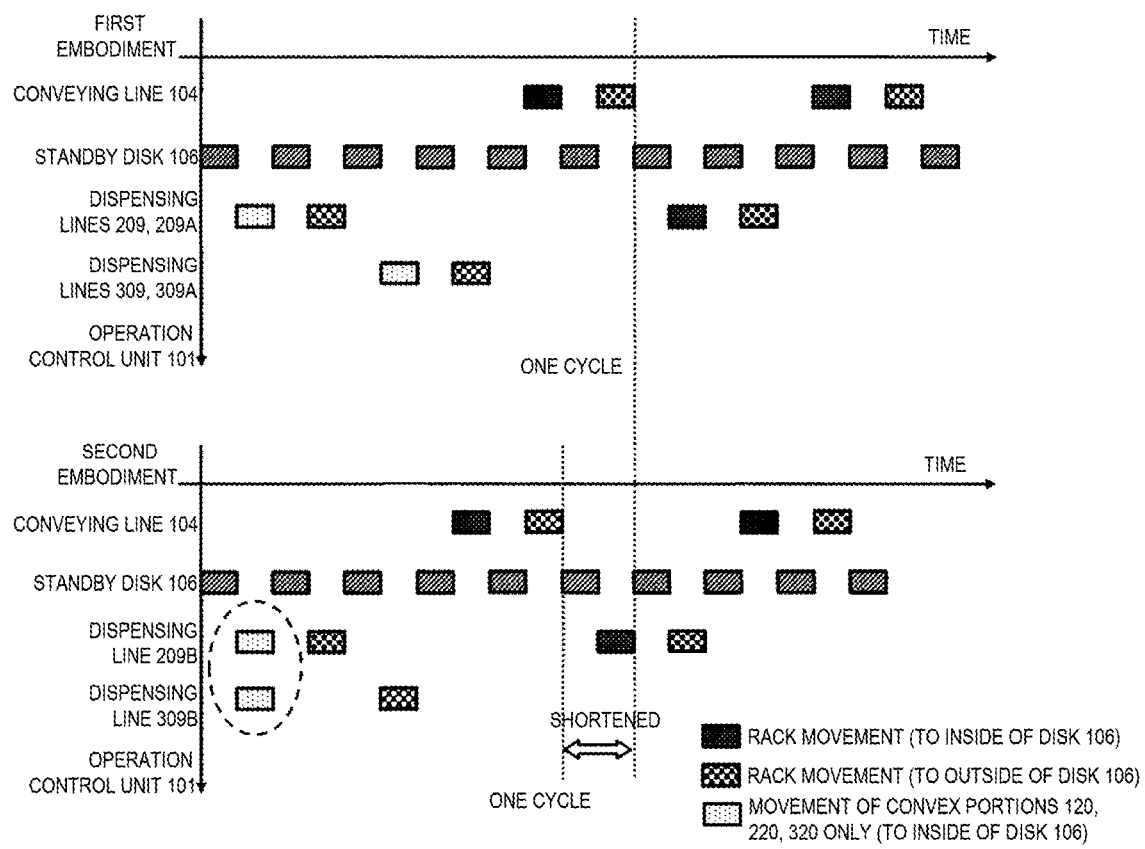

AUTOMATIC ANALYSIS SYSTEM AND SPECIMEN CONVEYING METHOD

TECHNICAL FIELD

The present invention relates to an automatic analysis system for measuring a concentration and an activity value of a target component in a biological sample (hereinafter, referred to as a sample) such as plasma, serum, or urine, and a sample conveying method which is suitable for such an automatic analysis system.

BACKGROUND ART

As an example of a technique which is applied to a device for conveying a rack holding a sample to an analysis unit to analyze the sample and which does not complicate a conveying system of the rack when the number of analysis units is either one or increased to two or more, PTL 1 discloses that a standby disk capable of rotating and stopping while holding a plurality of racks in a standby state is provided, a dedicated rack reciprocating conveying line is provided between each analysis unit and the standby disk, and only a single rack is guided to each rack reciprocating conveying line and the rack is returned to the standby disk after sample collection processing.

CITATION LIST

Patent Literature

PTL 1: JP-A-2010-204129

SUMMARY OF INVENTION

Technical Problem

An analysis result of a sample provides a large amount of information for diagnosing a disease state. An automatic analysis system is known as a device for automatically analyzing such a sample.

In an automatic analysis system, different measurement methods are used depending on items of components to be measured. For example, the automatic analysis system provides a function of executing an analysis method using a reagent that reacts with a component to be analyzed in a sample to change the color of a reaction solution (colorimetric analysis), an analysis method of counting labeled bodies using a reagent in which the labeled bodies are added to a substance that directly or indirectly specifically binds to the component to be analyzed (immunoanalysis), or the like.

Here, automatic analysis systems include a stand-alone type in which an analysis unit that analyzes the sample is operated as an independent device. In addition, a module type is known in which a plurality of analysis modules in different types of analysis fields such as biochemistry and immunization are connected to one another by a conveying line for conveying a sample rack holding a sample container containing a sample and operated as one system.

As an example of the module type, PTL 1 discloses a configuration in which a plurality of analysis modules are arranged so as to be connected to one sample rack distribution module along a conveying line formed of a belt conveyor, and a configuration in which a plurality of analysis units are connected through a rotor-type sample rack distribution module that holds a plurality of sample racks and can be transferred to and from different analysis modules or through a plurality of analysis modules in the same field.

In such a module-type system, in order to analyze one sample by a plurality of measurement methods, a conveying method of supplying the sample from a common mechanism that distributes the sample rack to a plurality of different analysis units is required.

Here, in recent years, the automatic analysis system is increasingly required to be reduced in size. It is an important problem to reduce a footprint of a sample rack by shortening a conveying distance of the sample rack even in the module-type device.

However, in the configuration in which the plurality of analysis modules are arranged in the same direction with respect to one sample rack distribution module as in the technique of PTL 1 described above, it is necessary to extend the conveying line to the analysis module at the end, and it is not possible to avoid the increase in the size of the system.

When the rotor-type sample rack distribution module is arranged at a center and connected with a plurality of analysis modules, in the configuration in which the left and right analysis modules are arranged in rotational symmetry as shown in PTL 1, access by a user at the time of replacement of a reagent, maintenance, or the like is limited.

For example, in the case of an arrangement shown in FIG. 8 in PTL 1, the reagent disks in the left and right analysis modules in the drawing are arranged in rotational symmetry with respect to a line passing through a rotation center of a rack standby disk. Therefore, when the reagent disk of the analysis unit on the left side is to be accessed after the reagent disk of the analysis unit on the right side in the drawing is accessed, it is necessary to go half a circumference around the system, and it cannot be said that accessibility for the user is sufficient, which leaves room for improvement.

The invention has been made in view of the above problems, an object of the invention is to provide an automatic analysis system and a sample rack conveying method in which conveying efficiency of a sample rack is improved and the accessibility for a user is good even in a configuration in which a sample is supplied from a common sample rack distribution module to a plurality of analysis modules.

Solution to Problem

The invention includes a plurality of means for solving the above problems. As an example, an automatic analysis system includes: a plurality of analysis modules that analyze a sample by mixing the sample with a reagent; a conveying line that conveys a sample rack which holds a sample container that contains the sample; and a sample rack distribution module that includes a rotatable standby disk formed with a plurality of holding units which hold the sample rack, and that supplies the sample rack to the analysis modules. Each of the analysis modules includes: a sample dispensing mechanism that dispenses a sample held in the sample rack; and a dispensing line that draws and delivers the sample rack from the sample rack distribution module to a sample dispensing position by the sample dispensing mechanism. The conveying line and a plurality of dispensing lines are arranged not to be parallel to each other. A device layout of the analysis modules with the sample rack distribution module interposed therebetween is arranged such that all modules can be accessed from the same plane. The plurality of analysis modules are arranged with a sample rack conveying-in unit and a sample rack conveying-out unit arranged in the sample rack distribution module interposed therebetween in addition to the sample rack distribution module.

Advantageous Effect

According to the invention, it is possible to provide an automatic analysis system in which conveying efficiency of a sample rack is improved and the accessibility for a user is good even in a configuration in which a sample is supplied from a common sample rack distribution module to a plurality of analysis modules. Problems, configurations, and effects other than those described above will be further clarified with the following description of embodiments.

BRIEF DESCRIPTION OF DRAWINGS

FIG. 1 shows a basic configuration of an automatic analysis system according to an embodiment of the invention.

FIG. 2 shows an outline of a sample rack suitably used in an automatic analysis system according to a first embodiment.

FIG. 3 shows an outline of a structure of a conveying convex portion in the automatic analysis system according to the first embodiment.

FIG. 4 shows a configuration of the automatic analysis system shown in FIG. 1 viewed from an X-X' direction.

FIG. 5 shows an example of an arrangement of a sample rack distribution module and an analysis module in an automatic analysis system of a related art for comparison.

FIG. 6 shows another example of the arrangement of the sample rack distribution module and the analysis module in the automatic analysis system of the related art for comparison.

FIG. 7 shows an example of an arrangement of a sample rack distribution module and an analysis module in the automatic analysis system according to the first embodiment of the invention.

FIG. 8 shows another example of the arrangement of the sample rack distribution module and the analysis module in the automatic analysis system according to the first embodiment.

FIG. 9 is a matrix showing an effect of shortening conveying time in the automatic analysis system according to the first embodiment.

FIG. 10 shows an example of an arrangement of a sample rack distribution module and an analysis module in an automatic analysis system according to a second embodiment of the invention.

FIG. 11 shows an example of the arrangement of the sample rack distribution module and the analysis module in the automatic analysis system according to the second embodiment.

FIG. 12 shows an outline of an operation range of a conveying convex portion in the automatic analysis system according to the second embodiment.

FIG. 13 shows an operation of the conveying convex portion and an operation of the sample rack distribution module in the automatic analysis system according to the second embodiment.

FIG. 14 shows an operation of the conveying convex portion and an operation of the sample rack distribution module in the automatic analysis system according to the second embodiment.

FIG. 15 shows an operation of the conveying convex portion and an operation of the sample rack distribution module in the automatic analysis system according to the second embodiment.

FIG. 16 is a time chart showing an effect of shortening conveying time by a sample rack conveying method in the automatic analysis system according to the second embodiment.

FIG. 17 is a time chart showing the effect of shortening the conveying time by the sample rack conveying method in the automatic analysis system according to the second embodiment.

FIG. 18 is a time chart showing the effect of shortening the conveying time by the sample rack conveying method in the automatic analysis system according to the second embodiment.

FIG. 19 is a time chart showing the effect of shortening the conveying time by the sample rack conveying method in the automatic analysis system according to the second embodiment.

DESCRIPTION OF EMBODIMENTS

Hereinafter, embodiments of an automatic analysis system and a sample conveying method according to the invention will be described with reference to the drawings.

First Embodiment

An automatic analysis system and a sample conveying method according to a first embodiment of the invention will be described with reference to FIGS. 1 to 9.

First, an overall configuration of the automatic analysis system according to the present embodiment will be described with reference to FIG. 1. FIG. 1 is a diagram showing a basic configuration of the automatic analysis system according to the present embodiment.

Here, an automatic analysis system 1 shown in FIG. 1 analyzes a sample of plasma, serum, or urine. An example in which two different analysis modules 200 and 300 are connected through one sample rack distribution module 100 will be described. Further, a configuration in which a biochemical analysis module is connected as the analysis module 200 and an immunoanalysis module is connected as the analysis module 300 is shown.

However, the analysis modules to be connected are not limited to these. Other analysis modules such as a blood coagulation analysis module, or analysis modules that execute the same type of analysis on both left and right sides can be appropriately arranged according to a use environment. Furthermore, the number of analysis modules to be connected is not limited to two, and may be three or more.

The module-type automatic analysis system 1 according to the present embodiment shown in FIG. 1 is schematically constituted by two analysis modules 200 and 300, the sample rack distribution module 100 having a conveying line 104 for conveying a sample rack on which one or more sample containers 12 (see FIG. 2 and the like) containing samples to be analyzed are mounted, and a control device 400 for controlling an overall operation of the automatic analysis system 1.

As shown in FIG. 2, the sample rack 10 handled by the automatic analysis system 1 is mounted with one or more sample containers 12, each containing a sample to be subjected to qualitative and quantitative analysis in the automatic analysis system 1.

Here, the sample rack includes at least the sample rack 10 on which sample containers 12 containing a sample to be analyzed with normal priority (normal sample) is mounted, and an emergency sample rack 11 on which sample containers containing an emergency sample having a higher degree of emergency of analysis measurement than that of the sample rack is mounted.

The sample rack distribution module 100 is a device that supplies the sample rack 10 and the emergency sample rack 11 that hold the sample containers 12 containing the samples to the analysis modules 200 and 300 connected to both sides through a standby disk 106. The sample rack distribution module 100 includes a sample rack conveying-in unit 102, an emergency sample rack input unit 112, a sample identification device 105, the conveying line 104, the standby disk 106, a sample rack conveying-out unit 103, and a conveying module control unit 101.

The sample rack conveying-in unit 102 is provided on a side surface side of the conveying line 104, and supplies the sample rack 10 on which the normal sample is mounted to the conveying line 104.

The sample rack conveying-out unit 103 is provided on the side surface side of the conveying line 104 similarly to the sample rack conveying-in unit 102, and stores the sample rack 10 conveyed out from the conveying line 104.

An emergency sample rack standby area 113 is provided on the conveying line 104, and is an area where the emergency sample rack 11 can temporarily stand by.

The sample identification device 105 is a device for inquiring analysis request information regarding the sample contained in the sample container 12 mounted on the sample rack 10 or the emergency sample rack 11 conveyed on the conveying line 104. The sample identification device 105 reads and identifies an identification medium (not shown) such as RFID and barcode provided on the sample rack 10, the emergency sample rack 11, or the sample container 12.

The standby disk 106 is arranged at one end of the conveying line 104, and is a disk having one or more slots 106A capable of mounting the sample rack 10 and the like on an outer circumference thereof, and has a rotor structure that performs a circular motion.

The standby disk 106 exchanges the sample rack 10 between one end of the conveying line 104 and each of one end of a dispensing line 209 of the analysis module 200 and one end of a dispensing line 309 of the analysis module 300.

The conveying line 104 is connected to a certain point on a radial circumference of the standby disk 106, so as to convey the sample rack 10 in and out. When the point is at a position of 0° on the circumference, the dispensing line 209 of the analysis module 200 is connected to a position other than a position parallel to the position to which the conveying line 104 is connected (180°) (90° in a counter-clockwise direction in FIG. 1).

The dispensing line 309 of the analysis module 300 is connected to a position other than the position parallel to the position to which the conveying line 104 is connected (180°) (108° in a clockwise direction in FIG. 1).

Further, as shown in FIG. 1, the conveying line 104 is arranged so as not to be parallel to the dispensing line 209 and the dispensing line 309.

The dispensing lines 209 and 309 are arranged so that both a line extending in a conveying direction of the sample rack 10 or the like of the dispensing line 209 and a line extending in the conveying direction of the sample rack 10 or the like of the dispensing line 309 pass through the slots 106A of the standby disk 106.

That is, the sample rack distribution module 100 and the two left and right analysis modules 200 and 300 are arranged such that when the dispensing line 209, 309 of one of the analysis modules 200 and 300 is connected to one slot 106A of the standby disk 106, the dispensing line 209, 309 of the other of the analysis modules 200 and 300 is also connected to one slot 106A.

The present embodiment describes a case in which the dispensing lines 209 and 309 are connected in directions radially extending from a center of the standby disk 106, whereas the dispensing lines 209 and 309 and the slots 106A do not need to be arranged and formed in directions radially extending from the center of the standby disk 106.

Further, the sample rack 10 contained in the standby disk 106 has address information for identifying the position of the slot 106A in which the sample rack 10 is held. Therefore, the position of the slot 106A to which the sample rack 10 returns after being conveyed to each of the dispensing lines 209 and 309 is the same slot 106A in the standby disk 106. That is, the standby disk 106 rotates, stops at a position at which an original slot 106A is connected to the dispensing lines 209 and 309, and receives the sample rack 10 from the dispensing lines 209 and 309.

A sample rack 10 newly conveyed from the conveying line 104 is basically contained at a place next to (one next to) the place where a sample rack 10 is last contained.

With such a structure, it is not always necessary to sequentially process the sample racks 10 in a placing order. That is, when there is a sample rack 10 having a higher priority or an emergency sample rack 11, the sample rack 10 or the emergency sample rack 11 can be processed first.

The sample rack 10 that has been dispensed by the analysis module 200 and the analysis module 300 can stand by for an output of a measurement result in the standby disk 106 and be subjected to a processing such as automatic retest as necessary. When the processing is finished, the sample is conveyed to the sample rack conveying-out unit 103 through the conveying line 104.

The conveying module control unit 101 is apart that executes control of an operation of conveying an appropriate sample rack 10 from the standby disk 106 to the dispensing lines 209 and 309 and a conveying operation of returning the sample rack 10 and the like from the dispensing lines 209 and 309 to the standby disk 106, and controls the operation of each mechanism based on a command from the control device 400 described later.

The analysis modules 200 and 300 are modules that perform sampling (dispensing) on the sample contained in the sample container 12 mounted on the sample rack 10 or the like, and perform the qualitative and quantitative analysis by mixing the sample with a reagent.

The analysis module 200 includes the dispensing line 209, a sample identification device 210, a sample dispensing mechanism 208, a reaction disk 211, a measurement unit 217 that performs the qualitative and quantitative analysis by measuring a mixed solution of the sample and the reagent dispensed into a reaction container (reaction solution), a reagent dispensing mechanism 219, a reagent disk 218, a control unit 201, and the like.

The dispensing line 209 is a conveying mechanism that can perform a reciprocating operation of drawing and delivering the sample rack 10 and the like from the standby disk 106 of the sample rack distribution module 100 to a sample dispensing position by the sample dispensing mechanism 208.

For example, as shown in FIG. 3, the dispensing line 209 includes a conveying convex portion 220 that is fitted into a concave portion 13 provided on a bottom surface of the sample rack 10 or the like as shown in FIG. 2 so as to convey the sample rack 10, a rail 220A for moving the conveying convex portion 220, a motor 220B, and the like.

One conveying convex portion 220 is provided on the dispensing line 209. An operation range of the conveying convex portion 220 is from an end portion of the dispensing line 209 to the inside of the slot 106A of the standby disk 106. In the standby disk 106, the conveying convex portion 220 can be rotated 360° while being placed on the standby disk 106 side.

With such a configuration, as shown by an arrow in FIG. 3, the sample rack 10 can be conveyed within the operation range of the conveying convex portion 220.

While the sample rack 10 is to be exchanged between the standby disk 106 and the dispensing line 209, the standby disk 106 is stopped. When the exchange is completed, the standby disk 106 is rotated to a position where a place for exchanging the next sample rack 10 is connected to the dispensing line 209.

The dispensing line 209 is exemplified by a configuration that performs conveyance by fitting a protrusion structure driven along the dispensing line 209 into the concave portion 13 provided in advance in the sample rack 10, whereas a belt conveyor type conveying mechanism can also be adopted.

Such a mechanism is the same for the conveying line 104 and the dispensing line 309 of the analysis module 300 described later, and is provided with one conveying convex portion 120 and one conveying convex portion 320.

The sample identification device 210 is a device that reads the identification medium (not shown) such as the RFID or the bar code provided in the sample rack 10 and the sample container 12 for inquiring the analysis request information on the sample contained in the sample rack 10 drawn in by the dispensing line 209.

The sample dispensing mechanism 208 can be rotated and moved up and down, and moves to above the sample container 12 of the sample rack 10 conveyed to a dispensing position (dispensing area) on the dispensing line 209. Thereafter, the sample dispensing mechanism 208 moves downward to suck a predetermined amount of the sample held in the sample container 12.

The sample dispensing mechanism 208 after sucking the sample moves to above the reaction disk 211 and then moves downward to discharge the sample into one reaction container among a plurality of reaction containers provided on the reaction disk 211. After the sample is dispensed into the reaction container, the reaction disk 211 rotates and moves to a reagent dispensing position.

The reagent dispensing mechanism 219 can be rotated and moved up and down, moves to above the reagent container in the reagent disk 218 whose temperature is adjusted, and then moves downward to suck a predetermined amount of the reagent in the reagent container.

The reagent dispensing mechanism 219 moves to above the reaction disk 211, and then moves downward to discharge the reagent into the reaction container into which the sample is dispensed previously. The reaction disk 211 to which the reagent is discharged rotates and moves to a stirring position, and the sample and the reagent are stirred by a stirring mechanism (not shown).

After the stirring, the reaction disk 211 rotates and moves to a measurement position. Optical characteristics and the like of the mixed solution in the reaction container are measured by the measurement unit 217.

The control unit 201 is a computer that controls the operation necessary for analysis processing in the analysis module 200, and controls the operation of each device in the analysis module 200 based on the command from the control device 400 to be described later.

The analysis module 300 includes the dispensing line 309, a sample identification device 310, a sample dispensing mechanism 308, an incubator disk 311, a measurement unit 323 that performs the qualitative and quantitative analysis by measuring the mixed solution of the sample and the reagent dispensed into the reaction container (reaction solution), a reagent dispensing mechanism 319, a reagent disk 318, a sample dispensing tip and reaction container conveying mechanism 326, a reaction solution suction nozzle 327, a transfer mechanism 332, a magnetic separation unit 334, a sample dispensing tip and reaction container holding member 328, a reaction container stirring mechanism 329, a sample dispensing tip and reaction container waste hole 330, and a control unit 301.

The structures of the dispensing line 309, the sample identification device 310, the sample dispensing mechanism 308, the reagent disk 318, and the reagent dispensing mechanism 319 are the same as those of the dispensing line 209, the sample identification device 210, the sample dispensing mechanism 208, the reagent disk 218, and the reagent dispensing mechanism 219 of the analysis module 200, respectively.

The incubator disk 311 can be provided with a plurality of reaction containers for holding the reaction solution obtained by mixing and reacting the sample and the reagent, and can be rotated so as to move each of the arranged reaction containers in a circumferential direction to a predetermined position. Unlike the reaction container of the analysis module 200, the reaction container on the incubator disk 311 side is disposable.

The sample dispensing tip and reaction container conveying mechanism 326 can be moved in three directions including an X-axis, a Y-axis, and a Z-axis, and moves within a range of predetermined places of the sample dispensing tip and reaction container holding member 328, the reaction container stirring mechanism 329, the sample dispensing tip and reaction container waste hole 330, a sample dispensing tip mounting position 331, and the incubator disk 311 to convey the sample dispensing tips and the reaction containers.

A plurality of unused reaction containers and sample dispensing tips are installed in the sample dispensing tip and reaction container holding member 328. The sample dispensing tip and reaction container conveying mechanism 326 moves to above the sample dispensing tip and reaction container holding member 328, and moves downward to grip the unused reaction container, and then moves upward, and further moves to above a predetermined position of the incubator disk 311 and moves downward to arrange the reaction container.

A plurality of reagent containers are arranged on the reagent disk 318. A reagent disk cover is provided on an upper portion of the reagent disk 318. The inside of the reagent disk 318 is kept at a predetermined temperature. A reagent disk cover opening is provided in a part of the reagent disk cover.

The reagent dispensing mechanism 319 can rotate and move up and down, and moves downward after rotating to above the reagent disk cover opening, and immerses a tip of the reagent dispensing mechanism 319 in the reagent in a predetermined reagent container to suck a predetermined amount of the reagent. Next, after the reagent dispensing mechanism 319 moves upward, the reagent dispensing mechanism 319 rotationally moves to above a predetermined position of the incubator disk 311, and discharges the reagent into the reaction container.

The sample dispensing tip and reaction container conveying mechanism 326 moves to above the sample dispensing tip and reaction container holding member 328, and moves downward to grip the unused sample dispensing tip, and then moves upward, and further moves to above the sample dispensing tip mounting position 331 and moves downward to arrange the sample dispensing tip.

The sample dispensing mechanism 308 can be rotated and moved up and down, and rotates and moves to above the sample dispensing tip mounting position 331 and then moves downward, so that the sample dispensing tip is mounted to the tip by press-fitting. The sample dispensing mechanism 308 to which the sample dispensing tip is mounted moves to above the sample container 12 placed on the sample rack 10 and then moves downward, and sucks a predetermined amount of the sample held in the sample container 12 conveyed by the dispensing line 309.

The sample dispensing mechanism 308 after sucking the sample moves to above the incubator disk 311 and then moves downward, and discharges the sample to the reaction container to which the reagent is discharged previously.

When the sample discharge is completed, the sample dispensing mechanism 308 moves to above the sample dispensing tip and reaction container waste hole 330, so as to discard the used sample dispensing tip.

The reaction container to which the sample and the reagent are discharged is moved to the predetermined position by the rotation of the incubator disk 311, and is conveyed to the reaction container stirring mechanism 329 by the sample dispensing tip and reaction container holding member 328. The reaction container stirring mechanism 329 stirs and mixes the sample and the reagent in the reaction container by applying a rotation motion to the reaction container. The reaction container after stirring is returned to the predetermined position of the incubator disk 311 by the sample dispensing tip and reaction container holding member 328.

After the reaction between the sample and the reagent is started by stirring, another reagent may be further added at a specific timing to perform the reaction. For example, there is a process of further binding a magnetic bead having an antibody bound to a surface to an antigen described above. Therefore, the reaction container placed on the incubator disk 311 for a predetermined time is conveyed to the magnetic separate unit 334 by the transfer mechanism 332, and magnetic separation processing is performed on the sample. After the magnetic separation processing is completed, the reaction container is conveyed to the incubator disk 311 again by the transfer mechanism 332.

Regardless of whether magnetic separation is to be performed, the reaction container placed in the incubator disk 311 for the predetermined time is conveyed by the transfer mechanism 332 to a position directly below the reaction solution suction nozzle 327, and the reaction solution is guided to the measurement unit 323 by the reaction solution suction nozzle 327.

The measurement unit 323 detects a signal from the reaction solution and outputs the signal to the control device 400.

The reaction container into which the reaction solution is sucked is returned to the incubator disk 311 by the transfer mechanism 332. After that, the reaction container is moved to the predetermined position by the rotation of the incubator disk 311, moved from the incubator disk 311 to above the sample dispensing tip and reaction container waste hole 330 by the sample dispensing tip and reaction container holding member 328, and discarded.

The control unit 301 is a computer that controls the operation necessary for analysis processing in the analysis module 300, and controls the operation of each device in the analysis module 300 based on the command from the control device 400 to be described later.

Here, in the present invention, the device layout of the devices in the modules of the analysis modules 200 and 300 arranged with the sample rack distribution module 100 interposed therebetween, that is, an arrangement relationship among the devices, is line-symmetric with respect to a straight line 100A passing through the rotation center of the standby disk 106.

Among them, the devices included in the device layout include at least one of the dispensing lines 209 and 309, the sample dispensing mechanisms 208 and 308, the reaction disk 211 that holds the reaction container that mixes the sample and the reagent, the incubator disk 311, and a consumable setting unit that installs a consumable used for analysis of the sample.

For example, the dispensing lines 209 and 309 are both arranged on the sample rack distribution module 100 side on an upper side in FIG. 1 in the analysis modules 200 and 300. The sample dispensing mechanisms 208 and 308 are arranged around the dispensing lines 209 and 309, respectively. Further, the reaction disk 211 or the incubator disk 311 in which the reaction between the sample and the reagent is performed is arranged on the lower side in FIG. 1 from the sample dispensing mechanisms 208 and 308.

The measurement units 217 and 323 are arranged around the reaction disk 211 or the incubator disk 311 in each of the analysis modules 200 and 300, and are arranged at positions where access is easy.

Although not shown in FIG. 1, a measurement unit for measuring an electrolyte item may be further mounted on the analysis module 200 side. The measurement unit is also preferably arranged around the reaction disk 211, particularly between the dispensing line 209 and the reaction disk 211.

Further, the reagent disks 218 and 318 are arranged at positions farthest from the sample rack distribution module 100 in each of the analysis modules 200 and 300, and are arranged such that the user can easily access the reagent disks 218 and 318 since no other mechanism is arranged below the reagent disks 218 and 318 in FIG. 1. The reagent disks 218 and 318 are devices that are frequently accessed by the user due to replacement of a reagent container containing a reagent used for analysis, that is, an assay reagent individually prepared for each measurement target item, or the like, and are included in the consumable setting unit described above.

The consumable setting unit includes, in addition to the reagent disks 218 and 318, the sample dispensing tip and reaction container holding member 328 in the analysis module 300, a reagent bottle setting unit (not shown) that sets a reagent bottle containing a system reagent commonly used in various measurement target items, and the like. The reagent bottle setting unit is a mechanism that is often provided on the side surface of the analysis modules 200 and 300 on the lower side in FIG. 1.

The analysis modules 200 and 300 are respectively provided with covers 200A and 300A which are opened in the same direction as shown in FIG. 4 so as to improve operability. The user can access each of the devices from the same direction. FIG. 4 is a diagram of the cover 200A when the analysis module 300 is viewed from an A-A' direction and when the analysis module 200 is viewed from a B-B' direction in FIG. 1.

Returning to FIG. 1, the control device 400 controls the overall operation of the automatic analysis system 1, and includes a display unit 403, an input unit 404, a storage unit 402, and a control unit 401.

The display unit 403 is a display device such as a liquid crystal display that displays an input screen of various parameters and settings necessary for the analysis, analysis inspection data of initial inspection or reinspection, information related to a progress of the analysis, a measurement result, and the like.

The input unit 404 is a device for inputting the various parameters and settings, analysis request information, an instruction to start the analysis, and the like, and includes a keyboard and a mouse.

The storage unit 402 is a device that stores the various parameters and settings, the measurement result, the analysis request information of the sample contained in the sample container 12 mounted in each sample rack, and the like, and is constituted by a semiconductor memory such as a flash memory, a magnetic disk such as an HDD, or the like. The storage unit 402 also stores various computer programs and the like for controlling the operation of each device in the automatic analysis system 1 and executing various display processing and the like to be described later.

The control unit 401 is a computer including a CPU, a memory, and the like, controls various operations of each of the above members, and performs calculation processing for obtaining a concentration of a predetermined component in the sample from detection results obtained by the measurement units 217 and 323. The control of the operation of each device by the control unit 401 is executed based on various programs recorded in the storage unit 402.

The control processing of the operation executed by the control unit 401 may be integrated into one program, may be divided into a plurality of programs, or may be a combination thereof. Part or all of the programs may be implemented by dedicated hardware, or may be modularized.

Next, a relationship between the arrangement configuration of the sample rack distribution module and the analysis module and a movement angle of the sample rack will be described with reference to FIGS. 5 to 9. FIGS. 5 and 6 are diagrams showing an example of the arrangement of the sample rack distribution module and the analysis module in the automatic analysis system in the related art for comparison. FIG. 7 is a diagram showing an example of the arrangement of the sample rack distribution module and the analysis module in the automatic analysis system according to the first embodiment. FIG. 8 is a diagram showing another example of the arrangement of the sample rack distribution module and the analysis module in the automatic analysis system according to the first embodiment. FIG. 9 is a matrix for illustrating an effect of shortening the conveying time in the automatic analysis system according to the first embodiment.

In the following description, an angle when the standby disk 106 is rotated counterclockwise from a connection portion between the standby disk 106 and the conveying line 104 of the sample rack distribution module 100 to a connection portion between the standby disk 106 and the dispensing line 209 of the analysis module 200 is defined as $\theta 1$. Further, an angle when the standby disk 106 is rotated clockwise from the connection portion between the standby disk 106 and the conveying line 104 to the connection portion between the standby disk 106 and the dispensing line 309 of the analysis module 300 is defined as $\theta 2$.

Here, the arrangement configuration of the conveying line and the dispensing line can be divided into four cases shown in FIGS. 5 to 8, which will be described below, from a viewpoint of a necessary movement angle until the rack is supplied to the analysis module with respect to values of $\theta 1$ and $\theta 2$.

A conveying route of the rack until the sample is supplied to the analysis module is divided into two routes. One is a conveying route for measuring the sample only by the analysis module 200, and the other is a route for measuring the sample by conveying the sample to the analysis module 300 after the sample is measured by the analysis module 200. Here, as a premise, it is assumed that the analysis module 200 has a higher analysis request and a higher conveying frequency than the analysis module 300.

The route for measuring the sample only by the analysis module 300 and the route for measuring the sample by conveying the sample to the analysis module 200 after measuring the sample by the analysis module 300 are substantially the same as the route only by the analysis module 200 and the route from the analysis module 200 to the analysis module 300, respectively. Therefore, the discussion thereof is omitted.

Since there is an angle condition for shortening the necessary movement angle of the rack with respect to each conveying route, four arrangement configurations classified under this condition will be described below with reference to FIGS. 5 to 8.

FIG. 5 in which the conveying line and the dispensing line of one analysis module are arranged on a parallel line, and FIG. 6 in which the dispensing lines of two analysis modules are arranged on a parallel line are examples in which at least two lines of one conveying line and the dispensing lines of two analysis modules are arranged in parallel as comparative examples.

On the other hand, FIGS. 7 and 8 in which no ones among the conveying line and the dispensing lines of the two analysis modules are arranged on parallel lines are examples of the arrangement according to the present embodiment.

Here, an actual movement angle of the sample rack 10 or the like on the standby disk 106 actually includes not only the necessary movement angle but also a rotation movement angle for rack conveying in and out of another sample rack 10. However, here, only the necessary movement angle will be described without considering the rotation movement angle of other sample racks 10 and the like.

This is because the movement angle of another sample rack 10 and the like is also caused by a necessary movement angle amount of each sample rack 10 and the like, and thus the actual movement angle can be reduced by reducing the necessary movement angle.

As shown in FIG. 5, in the configuration in which a conveying line 1104 and a dispensing line 1209A of one analysis module are arranged on the parallel line, conditions of $0°<\theta 1 \leq 180°$, $0°<\theta 2 \leq 180°$, and $\theta 1+\theta 2<360°$ are satisfied. At this time, when the number of sample rack filling places in the standby disk 1106 is $2n$ ($n$ is a natural number, $2n$=the number of sample racks contained in the sample rack distribution module), an angle of an interval between adjacent rack filling places is $180°/n$. FIG. 5 shows a case where $n=10$.

When the sample rack 10 moves in an order of the conveying line 1104 to the dispensing line 1209A under the condition of θ1=180° as shown in FIG. 5, the movement angle is θ1 as shown by an arrow (A) in FIG. 5, and a maximum angle is 180°.

Further, when the sample rack 10 moves in the order of the conveying line 1104 to the dispensing line 1209A to a dispensing line 1309A, as shown by an arrow (B) in FIG. 5, the necessary movement angle excluding the rotation of the standby disk 1106 in a standby state is 180°+(180°−θ2)=360°−θ2. In order to reduce the necessary movement angle at this time, it is necessary to increase θ2. Since θ2=90° in FIG. 5, the necessary movement angle of the sample rack 10 is 360°−90°=270°.

As shown in FIG. 6, in the configuration in which the dispensing line 1209B and the dispensing line 1309B are arranged on parallel lines, conditions of 0°<θ1<180°, 0°<θ2≤180°, and θ1+θ2=180° are satisfied. At this time, when the number of sample rack filling places in the standby disk 1106 is 2n (n is a natural number), the angle of the interval between adjacent rack filling places is 180°/n. FIG. 6 shows a case where n=10.

In the arrangement configuration in FIG. 6, when the sample rack 10 moves in the order of the conveying line 1104 to the dispensing line 1209B, the movement angle is θ1, that is, 90°, as shown by the arrow (A) in FIG. 6.

In addition, when the sample rack 10 moves in the order of the conveying line 1104 to the dispensing line 1209B to the dispensing line 1309B, the necessary movement angle excluding the rotation of the standby disk 106 in the standby state is 360°−θ2 (=180°+θ1) as shown by the arrow (B) in FIG. 6. In this case, the movement angle of the rack in this configuration is 360°−90°=270°.

When FIGS. 5 and 6 are compared, in the conveying route of (A), the necessary movement angle of the sample rack 10 is θ1=90° in FIG. 6 with respect to θ1=180° in FIG. 5. Therefore, the necessary movement angle, that is, a movement time is reduced. On the other hand, in the conveying route of (B), both the arrangement of FIG. 5 and the arrangement of FIG. 6 are 360°−θ2 (=) 270°, which are the same.

Next, as shown in FIG. 7, when 0°<θ1<180°, 0°<θ2≤180°, and θ1+θ2>180° are satisfied, for example, a configuration is considered in which the angle θ1 formed by the conveying line 104 and the dispensing line 209 is 90° or less, and the angle θ2 formed by the conveying line 104 and the dispensing line 309 is greater than 90° and less than 180°. Also in this case, when the number of sample rack filling places in the standby disk 106 is 2n (n is a natural number), the angle of the interval between adjacent rack filling places is 180°/n.

This configuration is exemplified by a case in which θ1 and θ2 defined as described above are θ1=90° and θ2=(180°×m)/n (m is a natural number and n/2<m≤n−1). FIG. 7 shows a state where n=10 and m=6.

In such a configuration, when the sample rack 10 moves in the order of the conveying line 104 to the dispensing line 209, the necessary movement angle is θ1, which is 90°, as shown by the arrow (A) in FIG. 7.

When the sample rack 10 moves in the order of the conveying line 104 to the dispensing line 209 to the dispensing line 309, the necessary movement angle excluding the rotation of the standby disk 106 in the standby state is 360°−θ2, as shown by the arrow (B) in FIG. 7.

When FIG. 5 is compared with FIG. 7, in the case of (A), since the necessary movement angle θ1 in FIG. 7 is less than 180°, the necessary movement angle θ1 is always smaller than the necessary movement angle θ1 in FIG. 5 (=180°).

In the case of (B), the necessary movement angle is 360°−θ2 in both of FIGS. 5 and 7. Here, when the same θ2 is compared, θ2>180°−θ1 is satisfied in FIG. 7. Therefore, the necessary movement angle is always smaller than 270°. On the other hand, since θ2=90° in FIG. 5, 360°−θ2 is 270°. The necessary movement angle is smaller in the arrangement configuration in FIG. 7.

Next, when FIG. 7 is compared with FIG. 6, in the case of (A), since the necessary movement angle is θ1 in both FIGS. 6 and 7 (=90°), the necessary movement angle is equivalent.

In addition, in the case of (B), the necessary movement angle of 360°−θ2 in FIG. 7 is always smaller than 270°. However, in FIG. 6, since θ2=90°, 360°−θ2 is 270°. The necessary movement angle is smaller in the arrangement configuration in FIG. 7.

As described above, the arrangement configuration in FIG. 7 is superior to the arrangement configurations in FIGS. 5 and 6 in terms of the necessary movement angle. That is, it can be seen that the conveying time of the sample rack 10 can be shortened by not arranging the conveying line 104 and the dispensing lines 209 and 309 in parallel to one another.

Next, as shown in FIG. 8, when 0°<θ1<180°, 0°<θ2<180°, and θ1+θ2<180° are satisfied, for example, a configuration is considered in which the angle θ1 formed by the conveying line 104 and the dispensing line 209A is 90° or less, and the angle θ2 formed by the conveying line 104 and the dispensing line 309A is less than 90°. Also in this case, when the number of sample rack filling places in the standby disk 106 is 2n (n is a natural number), the angle of the interval between adjacent rack filling places is 180°/n.

This configuration is exemplified by a case in which θ1 and θ2 defined as described above are θ1=(180°×p)/n and θ2=(180°×q)/n (p and q are natural numbers and 1≤p and q<n/2). FIG. 8 shows a state where n=10 and p=q=4.

In such a configuration, when the sample rack 10 moves in the order of the conveying line 104 to the dispensing line 209A, the necessary movement angle is θ1 as shown by the arrow (A) in FIG. 8.

When the sample rack 10 moves in the order of the conveying line 104 to the dispensing line 209A to the dispensing line 309A, the necessary movement angle excluding the rotation of the standby disk 106 in the standby state is θ1+(θ1+θ2)=2θ1+θ2, as shown by the arrow (B) in FIG. 8.

When FIG. 8 is compared with FIG. 5, in the case of (A), since the necessary movement angle θ1 in FIG. 8 is less than 180°, the necessary movement angle θ1 is always smaller than the necessary movement angle in FIG. 5.

In addition, in the case of (B), when the necessary movement angle 2θ1+θ2 in FIG. 8 is compared with the necessary movement angle 360°−θ2 in FIG. 5, since both θ1 and θ2 are 90° or less or less than 90° in FIG. 8, 2θ1+θ2 cannot exceed 270°. On the other hand, since θ2 is less than 90°, 360°−θ2 does not become 270° or less. Therefore, the necessary movement angle in FIG. 8 is always smaller than that in FIG. 5.

Next, when FIG. 8 is compared with FIG. 6, in the case of (A), the necessary movement angle is θ1 in both FIG. 6 and FIG. 8. However, when comparing the same θ1, θ1=90° in FIG. 6, whereas θ1 is 90° or less in FIG. 8, and thus the necessary movement angle in FIG. 8 is equal to or smaller than that in FIG. 6.

In the case of (B), the necessary movement angle 2θ1+θ2 in FIG. 8 does not become 270° or more. On the other hand, the necessary movement angle of 360°−θ2 in FIG. 6 (=270°) is always larger than that in FIG. 8.

As described above, the arrangement configuration in FIG. 8 is also superior to the arrangement configurations in FIGS. 5 and 6 in terms of the necessary movement angle.

Table 1 below is a table showing the configuration of the arrangement shown in FIGS. 5 to 9, the conveying conditions, and the necessary movement angles required for each of the conditions.

TABLE 1

| Arrangement configuration | Condition 1 | Condition 2 | Necessary movement angle of conveying (A) | Necessary movement angle of conveying (B) |
|---|---|---|---|---|
| FIG. 5 | θ1 = 180° | 0° < θ2 < 180° | 180° Maximum value | 360° − θ2 Maximum value |
| FIG. 6 | θ1 < 180° | θ1 + θ2 = 180° | θ1 Less than maximum value | θ1 + 180° Maximum value |
| FIG. 7 | | θ1 + θ2 > 180° | θ1 Less than maximum value | 360° − θ2 Maximum value or less |
| FIG. 8 | | θ1 + θ2 < 180° | θ1 Less than maximum value | 2θ1 + θ2 Less than maximum value |

FIG. 9 is a matrix showing an effect of shortening the conveying time by the sample rack conveying method according to the first embodiment. In FIG. 9, a horizontal axis represents θ1, a vertical axis represents θ2, and the necessary movement angle of the conveying route (B) with respect to the values of θ1 and θ2 is shown.

As shown in FIG. 9, it can be seen that the necessary movement angle of the conveying route (B) is equal or smaller in FIGS. 7 and 8 of the arrangement configuration according to the present embodiment than in the arrangement configuration in FIGS. 5 and 6 which is the arrangement configuration in the related art, and the conveying time can be shortened.

Next, the effect of the present embodiment will be described.

The automatic analysis system 1 according to the first embodiment of the invention described above includes: the plurality of analysis modules 200 and 300 that analyze the sample by mixing the sample with the reagent; the conveying line 104 that conveys the sample rack 10 which holds the sample container 12 that contains the sample; and the sample rack distribution module 100 that includes the rotatable standby disk 106 formed with the plurality of slots 106A which hold the sample rack 10, and that supplies the sample rack 10 to the analysis modules 200 and 300. The analysis modules 200 and 300 include: the sample dispensing mechanisms 208 and 308 that dispense the sample held in the sample rack 10; and the dispensing lines 209 and 309 that draw and deliver the sample rack 10 from the sample rack distribution module 100 to a sample dispensing position by the sample dispensing mechanisms 208 and 308. The conveying line 104 and the plurality of dispensing lines 209 and 309 are arranged not to be parallel to each other. The device layout of the analysis modules 200 and 300 with the sample rack distribution module 100 interposed therebetween is line-symmetric with respect to the straight line 100A passing through the rotation center of the standby disk 106.

Accordingly, even in the configuration in which the sample is supplied from the common sample rack distribution module 100 to the plurality of analysis modules 200 and 300, a conveying movement amount of the sample rack 10 can be reduced and the time during which the conveying of the sample rack 10 is in the standby state can be reduced by the device layout configuration. Therefore, a conveying distance of the sample rack 10 and the emergency sample rack 11 can be made smaller than that of the configuration in the related art while preventing the device from becoming large. Therefore, the conveying time of the entire sample rack 10 can be shortened, and the efficiency can be improved in terms of a sample supply speed among processing capabilities of the automatic analysis system. Accordingly, it is possible to shorten a turn around time (TAT) required until the measurement result is output after the sample is introduced, as compared with the system in the related art. In addition, the accessibility of the user can be improved as compared with the device configuration in the related art.

In addition, since the dispensing lines 209 and 309 are arranged such that the lines extending in the conveying direction of the sample rack 10 and the like of the plurality of dispensing lines 209 and 309 pass through the slots 106A of the standby disk 106, the device configuration can be simplified as compared with the configuration of a second embodiment described later.

Further, since the conveying convex portions 120, 220, and 320 are further provided which are fitted into the concave portion 13 provided on the bottom surface of the sample rack 10 or the like when the sample rack 10 or the like is drawn or delivered from the standby disk 106, it is not necessary to consider consumption as in the conveying belt, and it is possible to adopt a mechanism capable of simply conveying the sample rack 10 or the like, and to more reliably prevent an increase in the size of the device.

Furthermore, when there are two dispensing lines 209 and 309, when an operating rate on the analysis module 200 side is higher than that on the analysis module 300, the dispensing line 209 is accessed more often compared to the dispensing line 309. In such a case, by satisfying the relationship that the angle formed by the conveying line 104 and the dispensing line 209 is 90° or less, and the angle formed by the conveying line 104 and the dispensing line 309 is greater than 90° and less than 180°, the necessary movement angle to the dispensing line 209, which is frequently accessed, can be reduced, and the time required for conveying can be shortened more reliably.

In addition, when high processing capability is required for both of the analysis modules 200 and 300, it is desirable to minimize the necessary movement angle of the sample rack 10 and the like in the standby disk 106. Therefore, by satisfying the relationship that the angle formed by the conveying line 104 and the dispensing line 209 is 90° or less and the angle formed by the conveying line 104 and the dispensing line 309 is less than 90°, the necessary movement angle can be made as small as possible, and the arrangement configuration is particularly suitable when high processing capacity is required.

Further, since the dispensing lines 209 and 309 are connected in the directions radially extending from the center of the standby disk 106, the slots 106A for holding the sample rack 10 and the like can be efficiently formed in the standby disk 106, and the size of the standby disk 106 can be reduced.

In addition, the devices included in the device layout include at least one of the dispensing lines 209 and 309, the sample dispensing mechanisms 208 and 308, the reaction disk 211 that holds the reaction container that mixes the sample and the reagent, the incubator disk 311, and the consumable setting unit that sets the consumable used for analysis of the sample. Therefore, the devices that are largely related to the conveying of the sample rack 10 and the devices that the user frequently accesses can be arranged on the same side in the system, which can greatly contribute to improving user access.

Furthermore, the sample dispensing mechanisms 208 and 308 are arranged between the dispensing lines 209 and 309 and the reaction disk 211 and the incubator disk 311, respectively. Therefore, a movement distance of the sample dispensing mechanisms 208 and 308 can be reduced, an analysis cycle can be reliably shortened, and the TAT can be more reliably shortened.

In addition, the consumable setting unit includes the reagent disks 218 and 318 that hold the reagent containers containing the reagents. Therefore, the device layout of the reagent disks 218 and 318 frequently accessed by the user for the introduction and removal of the assay reagent can be made the same in the analysis modules 200 and 300, and the user access can be reliably improved.

Second Embodiment

An automatic analysis system and a sample conveying method according to a second embodiment of the invention will be described with reference to FIGS. 10 to 19. The same components as those in the first embodiment are denoted by the same reference numerals, and the description thereof will be omitted. The same applies to the following embodiment.

In the first embodiment, the configuration is described in which, when one of the dispensing lines 209 and 309 is connected to the slot 106A holding the sample rack 10 of the standby disk 106, the other of the dispensing lines 209 and 309 is similarly connected to the slot 106A.

On the other hand, as shown in FIG. 10 and the like, in the present embodiment, when one of dispensing line 209B and 309B is connected to the slot 106A, the other of the dispensing line 209B and 309B is arranged so as to be connected to a region 106B that does not hold the sample rack 10, without being connected to the slots 106A of the standby disk 106.

That is, the dispensing line 309 is arranged such that, among the lines extending in conveying directions of the sample racks 10 and the like of the plurality of dispensing lines 209B and 309B, the line extending in the conveying direction of the dispensing lines 309B does not pass through any of the slots 106A of the standby disk 106 but passes through the region 106B between one slot 106A and an adjacent slot 106A.

FIGS. 10 and 11 are diagrams showing an example in which conveying angles of the sample rack from the sample rack distribution module 100 to the two right and left dispensing lines 209B and 309B are shifted by a predetermined angle according to the second embodiment.

As shown in FIGS. 10 and 11, in the present embodiment, the standby disk 106 has the slots 106A in which the conveying convex portion 220 can reciprocate at positions where the sample rack 10 can be contained, and the regions 106B in which the conveying convex portion 220 can reciprocate at positions between each two slots 106A and where the sample rack 10 cannot be contained.

FIG. 12 is a top view showing the configuration of the standby disk 106 and movement routes 222 of the conveying convex portions 120, 220, and 320. As shown in FIG. 12, in addition to the part of the slots 106A of the standby disk 106, the movement routes 222 of the conveying convex portions 120, 220, and 320 are provided with movement routes 224 so that the conveying convex portions 120, 220, and 320 can reciprocate in each of the regions 106B.

Here, two adjacent slots 106A are shifted by one pitch, and the two slots 106A and the region 106B existing therebetween are shifted by a half pitch.

FIGS. 13 to 15 are diagrams illustrating the operation of the conveying convex portions 120, 220, and 320 and the operation of the standby disk of the sample rack distribution module according to the present embodiment.

First, as shown in FIG. 13, the conveying convex portion 220 moves on the dispensing line 209B toward the standby disk 106 with the sample rack 10 placed thereon, and transfers the sample rack 10 to a predetermined position on the standby disk 106.

Next, as shown in FIG. 14, with the rotation of the standby disk 106, the conveying convex portion 220 moves to the above-described region 106B in which the sample rack 10 cannot be contained.

Then, as shown in FIG. 15, only the conveying convex portion 220 moves to the dispensing line 209B in a state where the sample rack 10 is not placed.

By repeating such an operation, exchange and preparation for the exchange of the sample rack 10 can be performed between the standby disk 106 and the dispensing line 209B. Similarly, the exchange and the preparation for the exchange of the sample rack 10 between the standby disk 106 and the dispensing line 309B of the other analysis module 300 and between the standby disk 106 and the conveying line 104 can also be performed.

FIGS. 16 to 19 are time charts for illustrating an effect of shortening the conveying time by conveying the sample rack by the configuration according to the present embodiment.

In the analysis modules on the left and right sides whose measurement principles are different, a cycle time from receiving the sample rack 10 by the dispensing lines 209B and 309B of the analysis modules 200 and 300 to returning the sample rack 10 to the standby disk 106 may be different due to a difference in the measurement principle or the like.

In FIGS. 16 to 19, a horizontal axis represents time (sec), and a vertical axis represents four operation units (the conveying line 104, the standby disk 106, and the left and right dispensing lines 209B and 309B). Each block shows a linear operation of the conveying convex portion 120 of the conveying line 104, a rotation operation of the standby disk 106, a linear operation of the conveying convex portion 220 of the dispensing lines 209, 209A, and 209B, and a linear operation of the conveying convex portion 320 of the dispensing lines 309, 309A, and 309B.

In addition, in FIGS. 16 to 19, a case where the emergency sample rack 11 does not intervene and the exchange of the sample rack 10 between the left and right dispensing lines 209, 209A, 209B, 309, 309A, and 309B and the standby disk 106 occurs continuously (the right side first) will be described.

When the left and right dispensing lines 209B and 309B hold the sample rack 10 in advance, in the configuration according to the second embodiment, as shown in FIG. 16, collection of the sample rack 10 to the standby disk 106 and the conveying (reception) of the sample rack 10 to be dispensed next are performed in the right dispensing line 209B.

Subsequently, the same conveying is performed also in the left dispensing line 309B. Thereafter, the sample rack 10 collected from each of the dispensing lines 209B and 309B is sent from the standby disk 106 to the conveying line 104, and the next sample rack 10 containing the unmeasured sample is transferred from the conveying line 104 to the standby disk 106.

During each sample rack conveying operation, a rotation operation of the standby disk 106 occurs.

As described above, when the left and right dispensing lines 209B and 309B hold the sample rack 10 in advance, also in the second embodiment, when the sample rack 10 is received on one of the dispensing lines 209B and 309B, the operation that only the conveying convex portion 320 moves alone does not occur on the other side.

Therefore, as shown in FIG. 17, similarly in the first embodiment, the time required for one cycle, which is a unit of a cycle from when the sample rack 10 is collected from the dispensing lines 209, 209A, 309, and 309A to when the conveying line 104 sends and collects the sample rack 10 to and from the sample rack conveying-out unit 103, is the same.

On the other hand, for example, when only the right dispensing lines 209, 209A, and 209B hold the sample rack 10 in advance, as shown in FIG. 18, in the configuration according to the first embodiment, while the sample rack 10 is exchanged between the right dispensing lines 209 and 209A and the standby disk 106, it is not possible to exchange the sample rack 10 with the dispensing lines 309 and 309A or to perform a preparation operation thereof (only the conveying convex portion 320 moves).

On the other hand, in the configuration according to the second embodiment, it is possible to simultaneously move only the conveying convex portion 320 to the standby disk 106 by using the time during which the sample rack 10 is acquired in the dispensing line 209B. Therefore, since the sample rack 10 can be moved from the dispensing line 309B into the standby disk 106 in a next operation cycle, the time required for one cycle described above can be shortened as compared with the first embodiment.

More specifically, as compared with the configuration according to the first embodiment, in the configuration of the second embodiment, it is possible to shorten the time required for the operation of sending the conveying convex portion 320 into the standby disk 106 on the left dispensing line 309B and the disk rotation operation which is the preparation thereof.

In addition, when none of the left and right dispensing lines 209, 209A, 209B, 309, 309A, and 309B holds the sample rack 10, in the configuration according to the first embodiment, as shown in FIG. 19, the conveying convex portion 320 cannot be moved from the left dispensing line 309 or 309A while the conveying convex portion 220 is moved from the right dispensing line 209 or 209A into the standby disk 106 due to the arrangement configuration.

On the other hand, in the configuration according to the second embodiment, while the conveying convex portion 220 is moved from the right dispensing line 209B into the standby disk 106, the conveying convex portion 320 can be simultaneously moved from the left dispensing line 309B into the standby disk 106. Therefore, it is possible to shorten the time required for one cycle. By repeating this cycle, it is possible to shorten an overall conveying time.

Next, the timing at which the cycle in which the conveying time can be shortened occurs will be described.

Here, an analysis module having a shorter analysis cycle is set as a main analysis module, and an analysis module having a later analysis cycle is set as a sub analysis module. For example, when cycle times of the main analysis module 200 (for example, the biochemical analysis module) and the sub analysis module 300 (for example, the immunoanalysis module) are set to as seconds and at seconds (a, s, t are natural numbers, s and t are prime to each other, and s<t), in the configuration according to the first embodiment, the operation of receiving or transferring the sample racks 10 simultaneously is possible only at the timing of a least common multiple of s and t.

For example, when the analysis cycle of the main analysis module 200 is set to 4 seconds and the analysis cycle of the sub analysis module 300 is set to 30 seconds, the timing of the least common multiple is 60 seconds. That is, in the configuration according to the first embodiment in which the conveying convex portions 220 and 320 are connected only to the slots 106A corresponding to the positions where the sample rack 10 can be contained, the sample racks 10 are simultaneously exchanged once every 60 seconds.

On the other hand, in the configuration shown in the second embodiment, since one dispensing line 209B and 309B is shifted by half of one slot 106A, although it is not possible to convey the sample racks 10 simultaneously, it is possible to move the conveying convex portion 320 in and out of the standby disk 106 while conveying the sample rack 10 on one dispensing line 209B. The operation becomes possible when the time is not an integral multiple of as seconds and an integral multiple of t.

For example, when the analysis cycle of the main analysis module 200 is 4 seconds, in 60 seconds, 14 timings occur at which the sample rack 10 is exchanged in the one dispensing line 209B and the conveying preparation operation of storing only the conveying convex portion 320 in the standby disk 106 in the other dispensing line 309B is simultaneously executed in order to receive the next sample rack 10.

Therefore, to compare the superiority from the viewpoint of the occurrence frequency, it is examined how frequently a conveying and preparation operation of the sample rack 10 in the configuration shown in FIG. 10 according to the second embodiment occurs with respect to a simultaneous conveying operation of the sample racks 10 in the configuration shown in FIG. 7 according to the first embodiment.

In this case, the simultaneous conveying operation occurs every ast seconds, whereas the conveying and preparation operation occurs a total of t−1 times every as seconds up to ast seconds. At this time, (1) When t=1, the conveying and preparation operation occurs 0 times in total. Here, since s<t, s cannot exist, and the superiority cannot be compared.

(2) When t=2, the conveying and preparation operation occurs once in total, and the occurrence frequency is the same. Therefore, none of the first embodiment and the second embodiment is superior.

(3) When t≥3, the conveying and preparation operation occurs twice or more in total, and the occurrence frequency of the conveying and preparation operation exceeds that of the simultaneous conveying operation. Therefore, the arrangement shown in FIG. 10 is superior.

From the above, it can be seen that the effect obtained by the arrangement in FIG. 10 is often equivalent to or better than the effect in FIG. 7 from the viewpoint of the occurrence frequency.

Other configurations and operations are substantially the same as configurations and operations of the automatic analysis system and the sample conveying method according to the first embodiment described above, and details are omitted.

Also in the automatic analysis system and the sample conveying method according to the second embodiment of the invention, substantially the same effects as those of the automatic analysis system and the sample conveying method according to the first embodiment described above can be obtained.

In addition, the dispensing lines 209 and 309 are arranged such that at least one or more lines, among the lines extending in the conveying directions of the sample rack 10 and the like of the plurality of dispensing lines 209 and 309, do not pass through the slots 106A of the standby disk 106, but pass between one slot 106A and an adjacent slot 106A. For example, while the dispensing line 209B of the analysis module 200 exchanges the sample rack 10 by the conveying convex portion 120 in the slot 106A of the standby disk 106, the conveying convex portion 220 can be sent from the dispensing line 309B of the analysis module 300 to one region 106B of the standby disk 106. Therefore, the sample rack 10 can be moved to the dispensing lines 209B and 309B at an earlier timing than in the configuration of the first embodiment.

OTHER EMBODIMENTS

The invention is not limited to the above embodiments, and includes various modifications. The above embodiments have been described in detail for easy understanding of the invention, and are not necessarily limited to those including all the configurations described above.

REFERENCE SIGN LIST

1: automatic analysis system
10: sample rack
11: emergency sample rack
12: sample container
13: concave portion
100: sample rack distribution module
100A: straight line
101: conveying module control unit
102: sample rack conveying-in unit
103: sample rack conveying-out unit
104: conveying line
105: sample identification device
106: standby disk
106A: slot (holding unit)
106B: region
112: emergency sample rack input unit
113: emergency sample rack standby area
120, 220, 320: conveying convex portion (sample rack conveying convex portion)
200, 300: analysis module
200A, 300A: cover
201, 301: control unit
208, 308: sample dispensing mechanism
209, 209A, 209B: dispensing line (first dispensing line)
210, 310: sample identification device
211: reaction disk
217, 323: measurement unit
218, 318: reagent disk
219, 319: reagent dispensing mechanism
220A: rail
220B: motor
222, 224: movement route
309, 309A, 309B: dispensing line (second dispensing line)
311: incubator disk
326: reaction container conveying mechanism
327: reaction solution suction nozzle
328: reaction container holding member
329: reaction container stirring mechanism
330: reaction container waste hole
331: sample dispensing tip mounting position
332: transfer mechanism
334: magnetic separation unit
400: control device
401: control unit
402: storage unit
403: display unit
404: input unit
1104: conveying line
1106: standby disk
1209A, 1209B, 1309A, 1309B: dispensing line

The invention claimed is:

1. In automatic analysis system, comprising:
two analysis modules that analyze a sample by mixing the sample with a reagent;
a conveying line that conveys a sample rack which holds a sample container that contains the sample;
a sample rack distribution module that includes
a sample rack conveying-in unit,
a sample rack conveying-out unit and
a rotatable standby disk formed with a plurality of holding units which hold the sample rack, and that supplies the sample rack to the analysis modules, and the rotatable standby disk further include an empty convex portion, wherein
each of the two analysis modules includes:
a sample dispensing mechanism that dispenses a sample held in the sample rack; and
dispensing lines that draw and deliver the sample rack from the sample rack distribution module to a sample dispensing position by the sample dispensing mechanism,
the conveying line and the two dispensing lines are arranged so that they are not parallel to each other,
a layout of the analysis modules with the sample rack distribution module interposed therebetween is arranged such that all modules can be accessed from the same plane,
the plurality of analysis modules are arranged with a sample rack conveying-in unit and a sample rack conveying-out unit arranged in the sample rack distribution module interposed therebetween in addition to the sample rack distribution module,
the standby disk is located on a side thereof that is biased towards the opposite to the side to be accessed by the user of the automatic analysis system,
the sample rack conveying-in unit and the sample rack conveying-out unit are positioned on the side closer to the user-accessible side of the automatic analysis system than on the side closest to the standby disk, two analysis modules are arranged side by side so as to sandwich the sample rack distribution module and, within it, the sample rack conveying-in unit and the sample rack conveying-out unit, and both analysis modules are arranged to be accessible to a user of the automatic analysis system from the side of the sample rack conveying-in unit and the sample rack conveying-out unit closer to the sample rack conveying-in unit and the sample rack conveying-out unit than the standby disk, of the two sides that abut the sample rack distribution module, wherein the dispensing lines are arranged such that at least one of lines extending in a conveying direction of the sample rack of the plurality of dispensing lines does not pass through the holding units of the standby disk but passes between two adjacent holding units, and wherein after the standby disk rotates, the empty convex portion in the holding unit of the standby disk is fitted into a concave portion on the bottom portion of the sample rack such that the sample rack is drawn and delivered from the standby disk.

2. The automatic analysis system according to claim 1, wherein the dispensing line is arranged such that a line extending in a conveying direction of the sample rack of the plurality of the dispensing lines passes through any of the holding units of the standby disk.

3. The automatic analysis system according to claim 1, wherein when there are two dispensing lines, an angle between the conveying line and a first dispensing line is equal to or less than 90°, and an angle formed by the conveying line and a second dispensing line is greater than 90° and less than 180°.

4. The automatic analysis system according to claim 1, wherein when there are two dispensing lines, an angle between the conveying line and a first dispensing line is equal to or less than 90°, and an angle formed by the conveying line and a second dispensing line is less than 90°.

5. The automatic analysis system according to claim 1, wherein the dispensing lines are connected in a direction extending radially from a center of the standby disk.

6. The automatic analysis system according to claim 1, wherein a device included in a device layout includes at least one of the dispensing line, the sample dispensing mechanism, a reaction disk that holds a reaction container which mixes the sample with the reagent, and a consumable setting unit that provides a consumable used for analysis of the sample.

7. The automatic analysis system according to claim 6, wherein the sample dispensing mechanism is arranged between each of the dispensing lines and the reaction disk.

8. The automatic analysis system according to claim 6, wherein the consumable setting unit includes a reagent disk that holds a reagent container which contains the reagent.

9. The automatic analysis system according to claim 1, wherein the sample rack conveying-in unit and the sample rack conveying-out unit can also be accessed from the same plane.

10. A method of conveying a sample to an analysis module in an automatic analysis system, wherein the automatic analysis system includes a plurality of analysis modules that analyze the sample by mixing the sample with a reagent, a conveying line that conveys a sample rack which holds a sample container that contains the sample, and a sample rack distribution module that includes a rotatable standby disk formed with a plurality of holding units which hold the sample rack, and that supplies the sample rack to the analysis modules, and the rotatable standby disk further include an empty convex portion; and the method includes:

arranging a layout of the analysis modules with the sample rack distribution module interposed therebetween such that all modules can be accessed from the same plane;

conveying the sample to each of the analysis modules via the conveying line, which are not parallel to each other, and the plurality of dispensing lines that draw and deliver the sample rack from the sample rack distribution module to a sample dispensing position by a sample dispensing mechanism that dispenses the sample held in the sample rack; and the plurality of analysis modules are arranged with a sample rack conveying-in unit and a sample rack conveying-out unit arranged in the sample rack distribution module interposed therebetween in addition to the sample rack distribution module, wherein the dispensing lines are arranged such that at least one of lines extending in a conveying direction of the sample rack of the plurality of dispensing lines does not pass through the holding units of the standby disk but passes between two adjacent holding units, and wherein after the standby disk rotates, the empty convex portion in the holding unit of the standby disk is fitted into a concave portion on the bottom portion of the sample rack such that the sample rack is drawn and delivered from the standby disk.

* * * * *